(12) United States Patent
Sze et al.

(10) Patent No.: US 8,497,841 B1
(45) Date of Patent: Jul. 30, 2013

(54) SYSTEM AND METHOD FOR A VIRTUAL KEYBOARD

(75) Inventors: Cheng-Feng Sze, San Jose, CA (US); Raymyung Cha, Sunnyvale, CA (US); Jae Eul Koo, Seoul (KR); Koang Hui Jeong, Seoul (KR)

(73) Assignee: Celluon, Inc., Seoul (KR)

( * ) Notice: Subject to any disclaimer, the term of this patent is extended or adjusted under 35 U.S.C. 154(b) by 0 days.

(21) Appl. No.: 13/593,344

(22) Filed: Aug. 23, 2012

(51) Int. Cl.
*G06F 3/02* (2006.01)
*G06F 3/033* (2006.01)
*G09G 5/00* (2006.01)
*G09G 5/08* (2006.01)
*G06K 9/00* (2006.01)
*G06K 9/36* (2006.01)
*G06K 9/32* (2006.01)

(52) U.S. Cl.
USPC ........... 345/168; 345/156; 345/158; 382/103; 382/106; 382/291; 382/295

(58) Field of Classification Search
USPC ................................................ 345/156–184
See application file for complete search history.

(56) References Cited

U.S. PATENT DOCUMENTS

| | | | |
|---|---|---|---|
| 5,825,352 A * | 10/1998 | Bisset et al. | 345/173 |
| 6,690,354 B2 | 2/2004 | Sze | |
| 6,710,770 B2 | 3/2004 | Tomasi et al. | |
| 7,215,327 B2 | 5/2007 | Liu et al. | |
| 7,242,388 B2 | 7/2007 | Lieberman et al. | |
| 7,305,368 B2 | 12/2007 | Lieberman et al. | |
| 2008/0179507 A2 | 7/2008 | Han | |
| 2008/0297482 A1 | 12/2008 | Weiss | |
| 2009/0006292 A1 | 1/2009 | Block | |
| 2009/0251425 A1 | 10/2009 | Sohn et al. | |
| 2009/0273668 A1 * | 11/2009 | Mirtich et al. | 348/86 |
| 2009/0295730 A1 * | 12/2009 | Shin et al. | 345/168 |
| 2010/0079397 A1 * | 4/2010 | Yang et al. | 345/173 |
| 2010/0231522 A1 * | 9/2010 | Li | 345/169 |
| 2011/0221684 A1 * | 9/2011 | Rydenhag | 345/173 |
| 2011/0291986 A1 * | 12/2011 | Rebeschi et al. | 345/174 |
| 2012/0044149 A1 * | 2/2012 | Son et al. | 345/169 |
| 2012/0075253 A1 * | 3/2012 | Tsai et al. | 345/175 |
| 2012/0162077 A1 | 6/2012 | Sze et al. | |
| 2012/0262423 A1 * | 10/2012 | Su et al. | 345/175 |

* cited by examiner

*Primary Examiner* — Alexander S Beck
*Assistant Examiner* — Nguyen H Truong
(74) *Attorney, Agent, or Firm* — Seed IP Law Group PLLC

(57) ABSTRACT

The present disclosure is directed to a method that includes capturing images of a working area that includes indicia of a virtual keyboard having a plurality of keys and detecting a selected key of the plurality of keys. The detecting of the selected key includes detecting an object in the working area by analyzing the captured images for variations in light intensity in the captured images. The detecting of the object includes generating a first row histogram based on the light intensity in each of the rows in each of the captured images, generating a first column histogram based on the light intensity in each of the columns in each of the captured images, and determining an identification of the selected key based on the first row histogram and the first column histogram. The method also includes outputting the identification of the selected key to a host device.

22 Claims, 18 Drawing Sheets

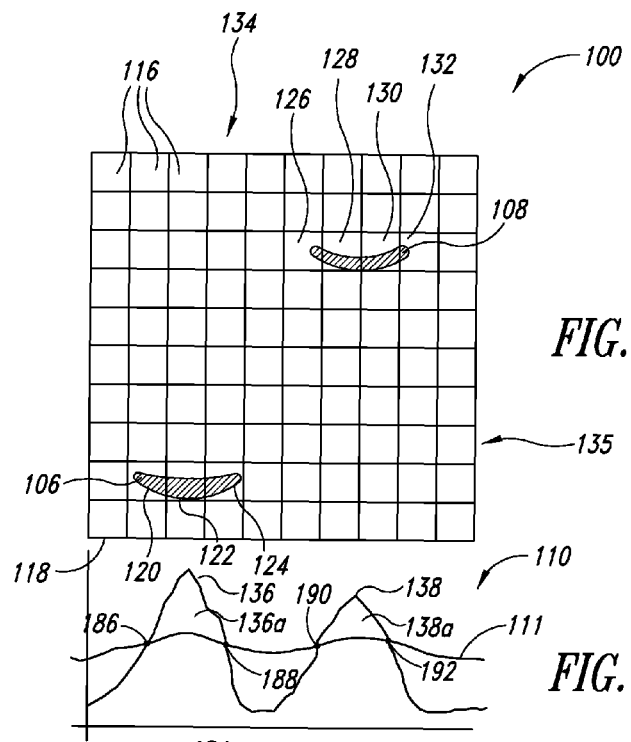
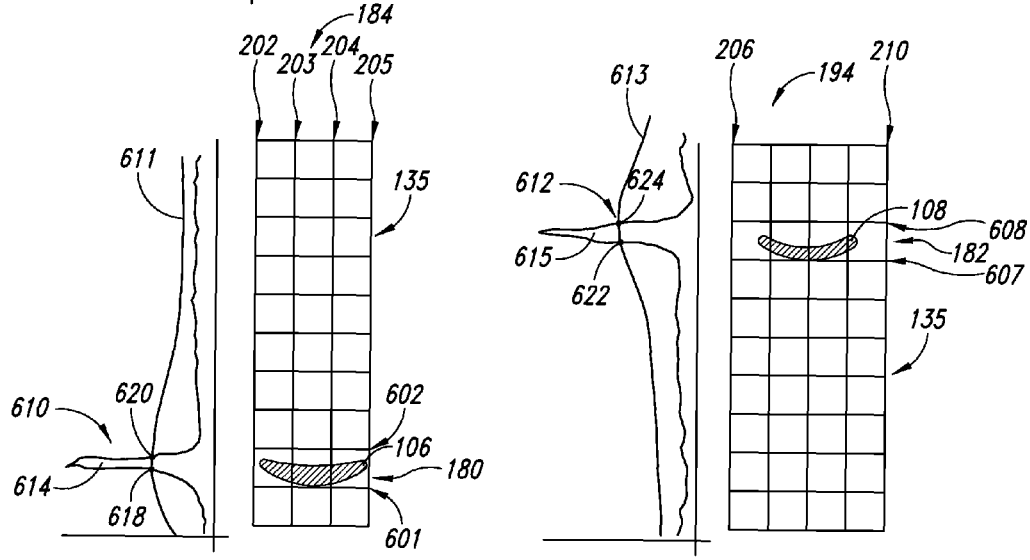
FIG. 2A
FIG. 2B
FIG. 2D  FIG. 2C  FIG. 2F  FIG. 2E

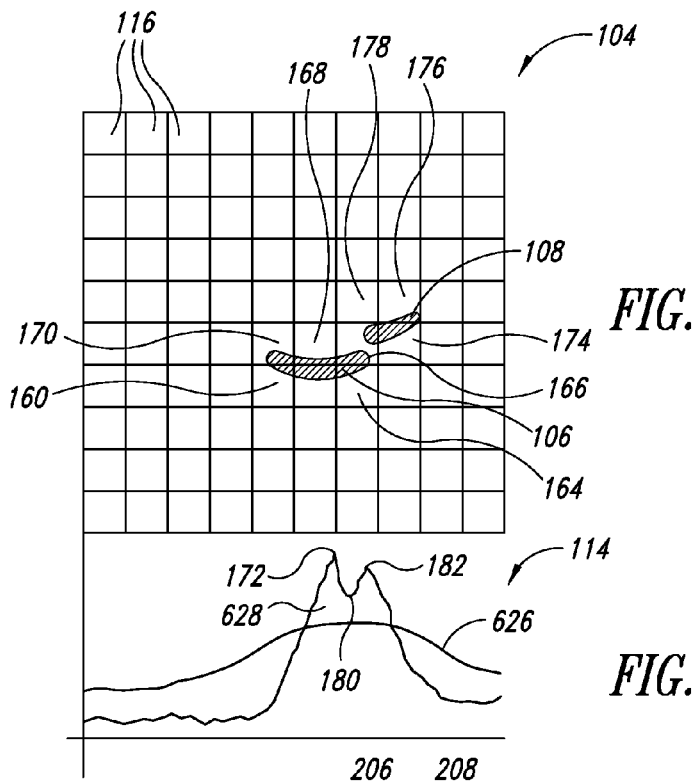
*FIG. 3A*
*FIG. 3B*
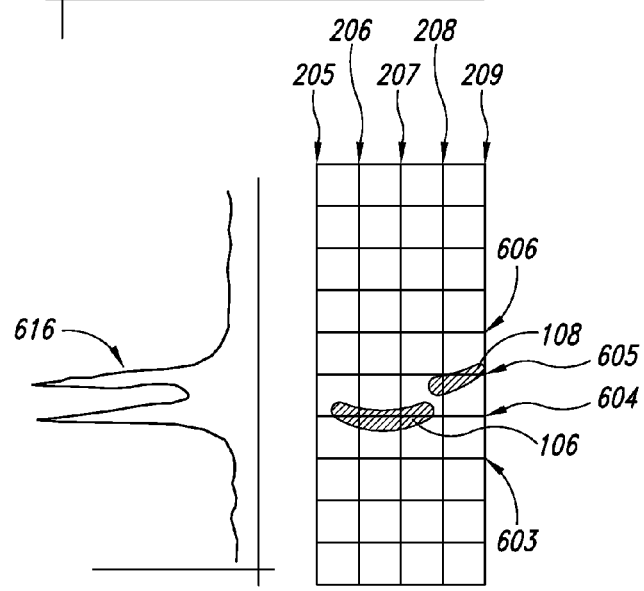
*FIG. 3D*   *FIG. 3C*

|   | 1 | 2 | 3 | 4 | 5 | 6 | 7 | 8 | ... | 633 | 634 | 635 | 636 | 637 | 638 | 639 | 640 |
|---|---|---|---|---|---|---|---|---|---|---|---|---|---|---|---|---|---|
| 1 | -313 | -312 | -311 | -310 | -309 | -308 | -307 | -306 | | 301 | 302 | 303 | 304 | 305 | 306 | 307 | 308 |
| 2 | -314 | -313 | -312 | -311 | -310 | -309 | -308 | -307 | | 302 | 303 | 304 | 305 | 306 | 307 | 308 | 309 |
| 3 | -315 | -314 | -313 | -312 | -311 | -310 | -309 | -308 | | 303 | 304 | 305 | 306 | 307 | 308 | 309 | 310 |
| 4 | -316 | -315 | -314 | -313 | -312 | -311 | -310 | -309 | | 304 | 305 | 306 | 307 | 308 | 309 | 310 | 311 |
| 5 | -317 | -316 | -315 | -314 | -313 | -312 | -311 | -310 | | 305 | 306 | 307 | 308 | 309 | 310 | 311 | 312 |
| 6 | -318 | -317 | -316 | -315 | -314 | -313 | -312 | -311 | | 306 | 307 | 308 | 309 | 310 | 311 | 312 | 313 |
| 7 | -319 | -318 | -317 | -316 | -315 | -314 | -313 | -312 | | 307 | 308 | 309 | 310 | 311 | 312 | 313 | 314 |
| 8 | -320 | -319 | -318 | -317 | -316 | -315 | -314 | -313 | | 308 | 309 | 310 | 311 | 312 | 313 | 314 | 315 |
| ... | | | | | | | | | | | | | | | | | |
| 236 | -1247 | -1243 | -1239 | -1235 | -1231 | -1228 | -1224 | -1220 | | 1200 | 1204 | 1208 | 1212 | 1216 | 1220 | 1224 | 1228 |
| 237 | -1263 | -1259 | -1255 | -1251 | -1247 | -1243 | -1239 | -1235 | | 1216 | 1220 | 1224 | 1228 | 1232 | 1235 | 1239 | 1243 |
| 238 | -1279 | -1275 | -1271 | -1267 | -1264 | -1260 | -1256 | -1252 | | 1232 | 1236 | 1240 | 1244 | 1248 | 1252 | 1256 | 1260 |
| 239 | -1296 | -1292 | -1288 | -1284 | -1280 | -1276 | -1272 | -1268 | | 1248 | 1252 | 1256 | 1260 | 1264 | 1268 | 1272 | 1276 |
| 240 | -1314 | -1310 | -1306 | -1301 | -1297 | -1293 | -1289 | -1285 | | 1265 | 1269 | 1273 | 1277 | 1281 | 1285 | 1289 | 1293 |
| 241 | -1332 | -1327 | -1323 | -1319 | -1315 | -1311 | -1307 | -1303 | | 1282 | 1286 | 1290 | 1294 | 1298 | 1303 | 1307 | 1311 |
| 242 | -1350 | -1346 | -1341 | -1337 | -1333 | -1329 | -1325 | -1320 | | 1300 | 1304 | 1308 | 1312 | 1316 | 1320 | 1325 | 1329 |
| 243 | -1369 | -1364 | -1360 | -1356 | -1352 | -1347 | -1343 | -1339 | | 1318 | 1322 | 1326 | 1330 | 1335 | 1339 | 1343 | 1347 |
| ... | | | | | | | | | | | | | | | | | |
| 473 | -4414 | -4400 | -4387 | -4373 | -4359 | -4346 | -4332 | -4318 | | 4250 | 4263 | 4277 | 4291 | 4304 | 4318 | 4332 | 4346 |
| 474 | -4414 | -4400 | -4387 | -4373 | -4359 | -4346 | -4332 | -4318 | | 4250 | 4263 | 4277 | 4291 | 4304 | 4318 | 4332 | 4346 |
| 475 | -4414 | -4400 | -4387 | -4373 | -4359 | -4346 | -4332 | -4318 | | 4250 | 4263 | 4277 | 4291 | 4304 | 4318 | 4332 | 4346 |
| 476 | -4414 | -4400 | -4387 | -4373 | -4359 | -4346 | -4332 | -4318 | | 4250 | 4263 | 4277 | 4291 | 4304 | 4318 | 4332 | 4346 |
| 477 | -4414 | -4400 | -4387 | -4373 | -4359 | -4346 | -4332 | -4318 | | 4250 | 4263 | 4277 | 4291 | 4304 | 4318 | 4332 | 4346 |
| 478 | -4414 | -4400 | -4387 | -4373 | -4359 | -4346 | -4332 | -4318 | | 4250 | 4263 | 4277 | 4291 | 4304 | 4318 | 4332 | 4346 |
| 479 | -4414 | -4400 | -4387 | -4373 | -4359 | -4346 | -4332 | -4318 | | 4250 | 4263 | 4277 | 4291 | 4304 | 4318 | 4332 | 4346 |
| 480 | -4414 | -4400 | -4387 | -4373 | -4359 | -4346 | -4332 | -4318 | | 4250 | 4263 | 4277 | 4291 | 4304 | 4318 | 4332 | 4346 |

FIG. 14

| | 1 | 2 | 3 | 4 | 5 | 6 | 7 | 8 | ... | 633 | 634 | 635 | 636 | 637 | 638 | 639 | 640 |
|---|---|---|---|---|---|---|---|---|---|---|---|---|---|---|---|---|---|
| 1 | 376 | 376 | 376 | 376 | 376 | 376 | 376 | 376 | | 376 | 376 | 376 | 376 | 376 | 376 | 376 | 376 |
| 2 | 377 | 377 | 377 | 377 | 377 | 377 | 377 | 377 | | 377 | 377 | 377 | 377 | 377 | 377 | 377 | 377 |
| 3 | 378 | 378 | 378 | 378 | 378 | 378 | 378 | 378 | | 378 | 378 | 378 | 378 | 378 | 378 | 378 | 378 |
| 4 | 380 | 380 | 380 | 380 | 380 | 380 | 380 | 380 | | 380 | 380 | 380 | 380 | 380 | 380 | 380 | 380 |
| 5 | 381 | 381 | 381 | 381 | 381 | 381 | 381 | 381 | | 381 | 381 | 381 | 381 | 381 | 381 | 381 | 381 |
| 6 | 382 | 382 | 382 | 382 | 382 | 382 | 382 | 382 | | 382 | 382 | 382 | 382 | 382 | 382 | 382 | 382 |
| 7 | 384 | 384 | 384 | 384 | 384 | 384 | 384 | 384 | | 384 | 384 | 384 | 384 | 384 | 384 | 384 | 384 |
| 8 | 385 | 385 | 385 | 385 | 385 | 385 | 385 | 385 | | 385 | 385 | 385 | 385 | 385 | 385 | 385 | 385 |
| ... | | | | | ... | | | | | | | | | ... | | | |
| 236 | 1655 | 1655 | 1655 | 1655 | 1655 | 1655 | 1655 | 1655 | | 1655 | 1655 | 1655 | 1655 | 1655 | 1655 | 1655 | 1655 |
| 237 | 1677 | 1677 | 1677 | 1677 | 1677 | 1677 | 1677 | 1677 | | 1677 | 1677 | 1677 | 1677 | 1677 | 1677 | 1677 | 1677 |
| 238 | 1700 | 1700 | 1700 | 1700 | 1700 | 1700 | 1700 | 1700 | | 1700 | 1700 | 1700 | 1700 | 1700 | 1700 | 1700 | 1700 |
| 239 | 1723 | 1723 | 1723 | 1723 | 1723 | 1723 | 1723 | 1723 | | 1723 | 1723 | 1723 | 1723 | 1723 | 1723 | 1723 | 1723 |
| 240 | 1747 | 1747 | 1747 | 1747 | 1747 | 1747 | 1747 | 1747 | | 1747 | 1747 | 1747 | 1747 | 1747 | 1747 | 1747 | 1747 |
| 241 | 1771 | 1771 | 1771 | 1771 | 1771 | 1771 | 1771 | 1771 | | 1771 | 1771 | 1771 | 1771 | 1771 | 1771 | 1771 | 1771 |
| 242 | 1796 | 1796 | 1796 | 1796 | 1796 | 1796 | 1796 | 1796 | | 1796 | 1796 | 1796 | 1796 | 1796 | 1796 | 1796 | 1796 |
| 243 | 1822 | 1822 | 1822 | 1822 | 1822 | 1822 | 1822 | 1822 | | 1822 | 1822 | 1822 | 1822 | 1822 | 1822 | 1822 | 1822 |
| ... | | | | | ... | | | | | | | | | ... | | | |
| 473 | 5995 | 5995 | 5995 | 5995 | 5995 | 5995 | 5995 | 5995 | | 5995 | 5995 | 5995 | 5995 | 5995 | 5995 | 5995 | 5995 |
| 474 | 5995 | 5995 | 5995 | 5995 | 5995 | 5995 | 5995 | 5995 | | 5995 | 5995 | 5995 | 5995 | 5995 | 5995 | 5995 | 5995 |
| 475 | 5995 | 5995 | 5995 | 5995 | 5995 | 5995 | 5995 | 5995 | | 5995 | 5995 | 5995 | 5995 | 5995 | 5995 | 5995 | 5995 |
| 476 | 5995 | 5995 | 5995 | 5995 | 5995 | 5995 | 5995 | 5995 | | 5995 | 5995 | 5995 | 5995 | 5995 | 5995 | 5995 | 5995 |
| 477 | 5995 | 5995 | 5995 | 5995 | 5995 | 5995 | 5995 | 5995 | | 5995 | 5995 | 5995 | 5995 | 5995 | 5995 | 5995 | 5995 |
| 478 | 5995 | 5995 | 5995 | 5995 | 5995 | 5995 | 5995 | 5995 | | 5995 | 5995 | 5995 | 5995 | 5995 | 5995 | 5995 | 5995 |
| 479 | 5995 | 5995 | 5995 | 5995 | 5995 | 5995 | 5995 | 5995 | | 5995 | 5995 | 5995 | 5995 | 5995 | 5995 | 5995 | 5995 |
| 480 | 5995 | 5995 | 5995 | 5995 | 5995 | 5995 | 5995 | 5995 | | 5995 | 5995 | 5995 | 5995 | 5995 | 5995 | 5995 | 5995 |

FIG. 15

SYSTEM AND METHOD FOR A VIRTUAL KEYBOARD

BACKGROUND

1. Technical Field

The present disclosure is directed to a system and method of optically sensing the presence of an object or objects, such as one or more fingers, in a detectable area to perform a text input, such as with a keyboard.

2. Description of the Related Art

Currently, small, light-weight, portable devices, such as smartphones and devices with touch panels are very popular. For these portable devices, there are few easy ways to input text and characters. Some devices include tiny built-in or on board mechanical keyboards or small printed virtual keyboards on the touch panels for typing the characters. Some of the touch panels are included with smartphones and, thus, have a small size. Other touch panels are included on larger devices, such as an iPad or a Kindle, which utilize a much bigger printed keyboard presented on the touch panel. The touch panels are electronic visual displays that can detect the presence and location of a touch within a display area or a screen. Touch panels are common in devices such as game consoles, all-in-one computers, tablet computers, and smartphones.

Although the keyboards are sufficient to input small numbers of characters, such as for a text message, they are not sufficient for inputting longer text, such as more than 200 words. In some instances, the virtual and manual keyboards in smartphones are too small for typing even one character, especially for older people. As a result, there can be many typos by users of such keyboards. On the other hand, virtual keyboards for touch panel devices can occupy almost half of the screen area just to achieve a standard key size.

Virtual keyboards have been proposed to detect text inputs. For example, U.S. Pat. No. 7,215,327 issued to Liu et al. entitled "Device and Method for Generating a Virtual Keyboard/Display," utilizes two scanning lasers to scan a working surface to determine locations and movements of a user's fingers. The device determines the finger's locations by comparing a time difference received from the two reflected scanning lasers.

Another example, U.S. Pat. No. 6,710,770 issued to Tomasi et al. entitled "Quasi-three-dimensional Method and Apparatus to Detect and Localize Interaction of User-Object and Virtual Transfer Device," describes a virtual keyboard and virtual input using two optical systems. The first optical system OS1 projects a beam of light parallel to a working surface and the second optical system OS2 receives and detects reflected light from the first optical system, OS1. By using homography, an object's actual location in the real world can be computed from the image pixel coordinate. In order to implement a virtual keyboard, a view angle of the second optical system OS2 would need to be 90 degrees or larger. With such large view angle, the lens distortion can be so significant that the homography transformation can cause huge errors in the computation of the object's real world location. As a result, issues with selection of the correct key can occur.

BRIEF SUMMARY

The present disclosure is directed to a full size, near zero weight virtual keyboard that does not occupy the screen or touch panel and thus does not obscure the information on the screen or touch panel.

The virtual keyboard is part of a system that includes a processor with memory, a light source, and an image sensor, which are configured to produce a keyboard pattern on a working surface. The keyboard pattern may be printed onto a transportable device or optically projected on the working surface. The printed transportable keyboard pattern can be a sheet of paper, can be pre-painted on the working surface, or a keyboard image displayed on a screen, such as a separate touch panel device. Projecting a keyboard pattern optically may be achieved using different technologies, such as diffractive optical elements (DOE) or digital light processing (DLP) technology. Alternatively, the keyboard may simply be a photograph or other physical representation of a keyboard that helps guide the user to the appropriate key position.

The present disclosure is directed to a method that includes capturing images of a working area, the working area including indicia of a virtual keyboard having a plurality of keys, the images including rows and columns of pixels. The method includes detecting a selected key of the plurality of keys, including detecting an object in the working area by analyzing the captured images for variations in light intensity in the captured images. The detecting of the object includes generating a first row histogram based on the light intensity in each of the rows in each of the captured images, generating a first column histogram based on the light intensity in each of the columns in each of the captured images, and determining an identification of the selected key based on the first row histogram and the first column histogram. In addition, the method includes outputting the identification of the selected key to a host device.

BRIEF DESCRIPTION OF THE SEVERAL VIEWS OF THE DRAWINGS

FIGS. 2A-2F, 3A-3D, and 4A-4C are images and histograms of fingers in an area of interest in accordance with an embodiment of the present disclosure;

FIG. 14 is an X axis calibration table in accordance with one embodiment of the present disclosure;

FIG. 15 is a Y axis calibration table in accordance with one embodiment of the present disclosure;

DETAILED DESCRIPTION

Figure 1A:
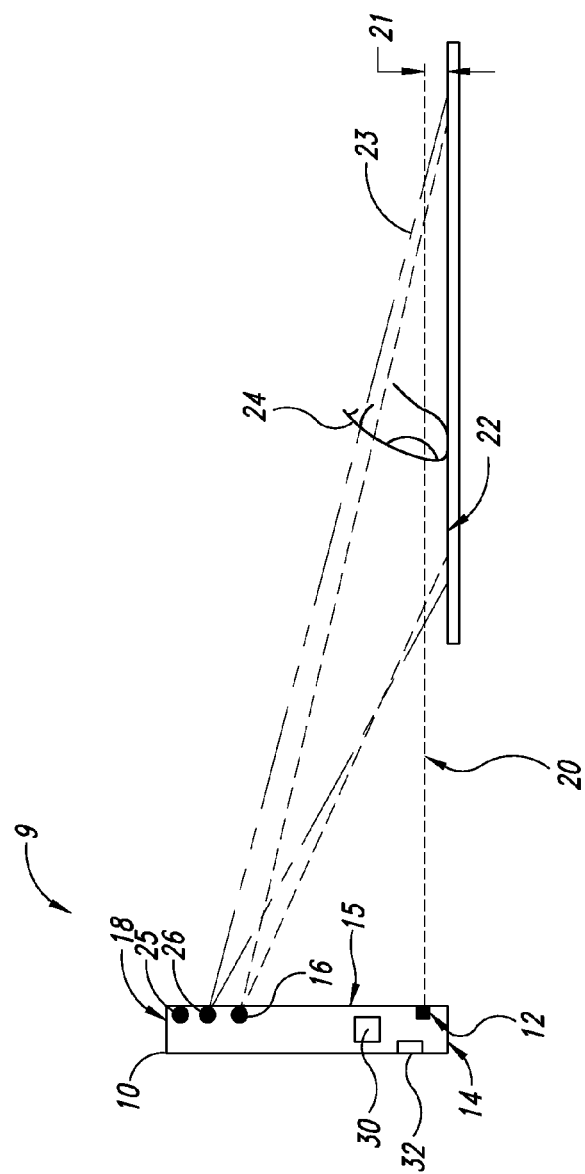
FIG. 1A is a side view of a virtual keyboard system in accordance with one aspect of the present disclosure.

In the following description, certain specific details are set forth in order to provide a thorough understanding of various embodiments of the disclosure. However, one skilled in the art will understand that the disclosure may be practiced without these specific details. In other instances, well-known structures associated with sensors and image projection have not been described in detail to avoid unnecessarily obscuring the descriptions of the embodiments of the present disclosure.

Unless the context requires otherwise, throughout the specification and claims that follow, the word "comprise" and variations thereof, such as "comprises" and "comprising," are to be construed in an open, inclusive sense, that is, as "including, but not limited to."

In addition, reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the drawings, identical reference numbers identify similar features or elements. The size and relative positions of features in the drawings are not necessarily drawn to scale. For example, the shapes of various features are not drawn to scale, and some of these features are enlarged and positioned to improve drawing legibility.

FIG. 1A is a side view of a virtual keyboard apparatus 9 having a housing 10 that includes a light source unit 12 located adjacent a bottom 14 and front 15 of the housing 10. In the virtual keyboard apparatus 9, an optical projection system 26 is positioned adjacent a top 18 of the housing 10 and an optical sensing system 16 is positioned between the optical projection system 26 and the light source unit 12. The projection system 26 projects a keyboard pattern 38 on a working surface 22 within a detectable area 23 (see FIG. 1B).

A user's finger 24 is shown intersecting a fan beam of the light 20 generated by the light source unit 12. The user's finger may touch the working surface 22, but only needs to break the fan beam of light 20 to be detected. The detectable area 23 is a two-dimensional area defined by the beam of light 20 and the area detectable by the sensor system 16. The working surface 22 includes no sensors or mechanical or electrical components and may be a table surface, an airplane tray, a piece of paper, or any other suitable surface. The detectable area 23 is any area in which the image sensor system 16 can capture an image of tips of the user's fingers 24 or other tips, such as the tip of a stylus or a pen.

The light source unit 12 emits the thin fan beam of light 20 in a specific frequency range, such as the infrared (IR) range (700 nm~1,400 nm). Ideally, the thin fan beam of light 20 is parallel to and close to the working surface 22. The optical sensing system 16 is angled or otherwise configured to look down at the working surface 22 and continuously senses a user's activities on the working surface 22 in the detectable area 23.

The housing 10 may include a light 25 that is configured to project light onto the working surface 22. The light 25 provides the user with a visual indication of boundaries of the field of view 36 so that the user can make sure their finger movements are within the field of view 36. The light 25 may be an LED, an incandescent light, or the like. Additionally, an intensity of the light 25 may be increased or decreased to an intensity deemed suitable by user.

In one embodiment, the light 25 is positioned to illuminate a portion of the working surface 22. The light 25 may provide no other function than to indicate to a user the approximate area in which finger movements may be detectable by the sensor system 16. In one embodiment, the sensor system is set to a frequency of light commensurate with that of the light source unit 12 and is configured to enhance the reflections from the user's finger 24. Although the light 25 is illustrated as being above the sensor system 16 and the projection system 26, the light 25 may be positioned below or lateral to the sensor system 16. According to one embodiment, the light 25 may include multiple lights which may be positioned so as to create an aesthetically pleasing design on, around, or proximate to the apparatus 9.

In one embodiment, the beam of light 20 is projected parallel to the working surface 22 and spaced from the working surface by a distance 21. In one embodiment, the distance 21 is in the range of 3 and 10 mm. However, the beam of light 20 may be projected at other angles for non-standard working surfaces, i.e., uneven, irregular, or angled working surfaces. The light source unit 12 may be an LED, a laser, or other light source capable of projecting a specific wavelength of light into the thin fan beam of light 20. The beam of light 20 has a thickness, which may be in the range of 0.1 mm and 0.5 mm or alternatively, in the range of 3 mm to 5 mm. The beam of light 20 is emitted at an intensity sufficient for illuminating a fingertip when in the beam of the beam of light 20. The light can be of any frequency and is preferably in the invisible light range; i.e., the infra-red (IR) spectrum is a preferred choice, having a frequency in the range of 1 and 430 THz.

In one embodiment, the light source unit 12 emits the beam of light 20 in pulses. Emitting the beam of light 20 in pulses has the advantage of saving power over a continuous emission of the beam of light 20. For example, if the light source unit 12 emits pulses of light at a frequency of 30 Hz with a duty cycle of 50%, the light source unit 12 will only be on half of the time it would have been on otherwise. The additional power efficiency can be utilized to extend battery life, or the power savings can be converted to an increase in the intensity of the beam of light 20. A greater intensity of the beam of light 20 results in better signal-to-noise ratio characteristics for images captured by the sensor system 16. Increases in signal-to-noise ratio result in greater measurement accuracy and therefore improved precision and performance for the apparatus 9.

Figure 1B:
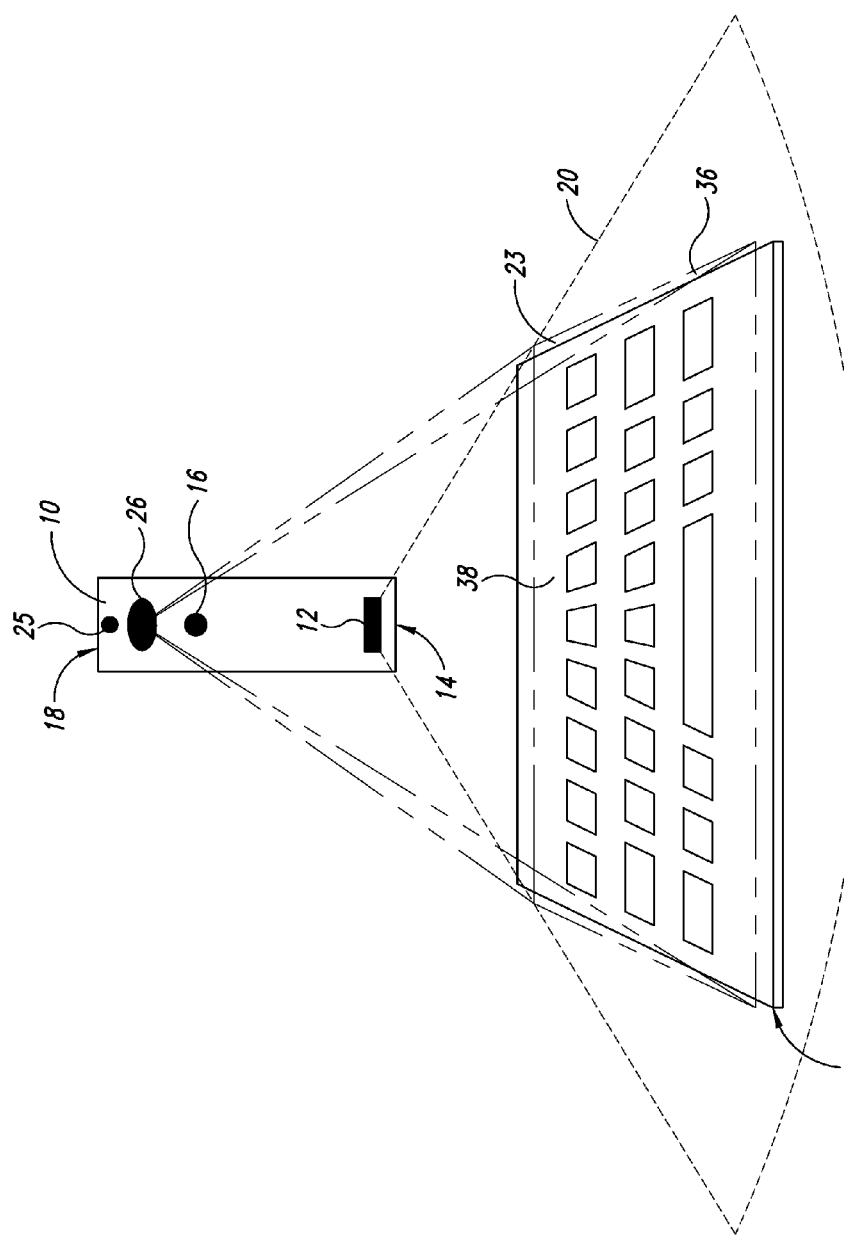
FIG. 1B is an isometric view of the virtual keyboard system of FIG. 1A.

FIG. 1B shows an isometric view of the virtual keyboard apparatus 9 of FIG. 1A projecting the keyboard pattern 38 onto the virtual working surface 22. In the beginning, there is no finger on the working surface 22 or in the detectable area 23. The user may use one or more finger tips, such as the finger 24, or a stylus to break the plane created by the beam of light 20 and select a key. In one embodiment, the user's finger 24 must only break the beam of light in the detectable area 23 to select a key of the virtual keyboard 38. However, in other embodiments, the apparatus 9 determines that the user's finger 24 selected a key when the fingertip touches the working surface 22.

The sensor system 16 detects the presence of the tip or tips in the plane of the beam of light 20. The sensor system 16 takes images of a field of view 36, which may be rectangular as shown in FIGS. 2A and 3A, may be circular, may match the dimensions of the beam of light 20, or may be any other suitable shape.

As a result of the beam of light having a thickness, as the finger 24 moves closer and closer to the working surface 22, the intensity of light representing the figure in the image grows larger. That is, when the finger 24 first touches or penetrates the beam 20 the corresponding image includes a small area of light representative of the finger 24. As the finger penetrates deeper through the beam 20, the corresponding area of light in the image becomes larger. Finally, as the finger touches the working surface 22, the finger 24 returns the largest image.

The image sensor system 16 continuously collects images of the user objects (such as fingers) illuminated by the light source 12, within the detectable area 23 of the keyboard. The images are then analyzed and key presses or events are reported as a consequence of the printed or projected keys being touched by the user's fingers 24. The sensor system 16 of the apparatus 9 is configured to capture a plurality of images 100, 104 (see FIGS. 2A and 3A), to detect positions of the fingertip or fingertips in the field of view 36. The images 100, 104 are an example of images of a first finger 106 and a second finger 108 typing a variety of letters.

Before an object enters the field of view 36, the optical sensor 16 captures images that are dark, i.e., no object or finger is detected. When the finger 24 goes down to touch a key of the projected keyboard pattern 38 on the working surface 22, a bottom portion of the finger (the fingertip) is illuminated by the light source 12 as soon as the finger penetrates or touches the fan beam of light 20. A light echo of the illuminated portion of the finger 24 is then imaged or received by the optical sensor system 16. After touching the key the finger moves up to leave the detectable area 23. Once the finger 24 is not interacting with the fan beam of the light 20, the optical sensor 16 does not detect the fingertip because no echo of light is received.

The sensor system 16 has an optical lens and a match optical filter that filters out any light that is not in the frequency range used by the light source and passes the desired light frequency to the imaging sensor. More particularly, the matched filter is designed to allow the incoming light in the frequency range of the light source to pass through it and blocks the rest. The optical filter is capable of filtering out a substantial portion of light other than the frequency of beam of light 20 emitted from the light source unit 12. The optical filter may be a low pass filter, a high pass filter, or a band pass filter, depending upon the frequency of the beam of light 20. In one embodiment, the beam of light 20 is emitted in the infrared frequency range and the optical filter is capable of filtering all but the infrared frequency range of the light spectrum.

The optical filter of the sensor system 16 may also be manufactured into the sensor system 16. Many image sensors include a color filter array ("CFA") that is deposited onto the lens of the image sensor during manufacturing prior to the deposition of a micro lens layer. Alternatively, a film of material may be placed over the lens of the image sensor after manufacture to filter all frequencies of light other than the frequency of the beam of light 20.

Because the optical filter blocks almost all the incoming light and only allows the chosen light range to pass through, the pixel values of the image represent the amount of the echoed light or an intensity of light. Therefore, there are no R (red), G (green), and B (blue) images. The images generated by the present disclosure are only the intensity images or gray level images. To reduce the ambient light interference, the image may first be subtracted out from a previously collected background image or vice versa. The background image is collected when the device is powered on and the collected images are stable, and it is updated when there is no user activity for a period of time (see FIG. 8). After background image subtraction, many known image segmentation techniques can be used for detecting one or more fingers or objects. In particular, a histogram-based method is applied for computation efficiency reasons and is discussed in more detail below. After image segmentation, the candidate object (s), e.g., finger(s) or fingertip(s), are identified, which may then be further screened based on their size.

In one embodiment, the apparatus 9 may include a low power movement detection device that sends a signal to the light system 12 and the sensor system 16 when movement has been detected. This is for a power saving mode, such that if there is no movement in the field of view 36 for a selected time period then the light system 12 and the sensor system 16 will go into sleep mode. Once a movement is detected, the light system 12 projects the fan beam of light and the sensor system 16 begins capturing images.

The apparatus 9 may include a power button 30 to control the operational state or mode of the apparatus 9. Additionally the power button 30 may be used to connect the apparatus 9 to a host device through a communication protocol such as Bluetooth. For example, two presses of the power button 30 may indicate that the apparatus 9 is to enable its internal Bluetooth radio. Furthermore the apparatus 9 may use the power button 32 to enter a low-power standby mode from which the apparatus 9 may recover more quickly from a sleep mode. For example a user may press the power button 3 times to enter a low-power standby or sleep mode. Alternatively, the apparatus 9 may be programmed so that the power button 30 may be pressed and held for a number of seconds to result in entering low-power standby mode.

The housing 10 may also include a communication port 32 to provide alternative modes of connection between the apparatus 9 and the host device. For example the communication port 32 may be a USB port, a FireWire port, a mini USB port, or the like. The apparatus 9 may be configured so that upon connection to a host through the communication port 32, the apparatus 9 turns off any wireless communication radios or and any batteries internal to the apparatus 9. The apparatus 9 may also automatically go into a recharge mode when directly connected to the host device through the communication port 32.

Figure 5:
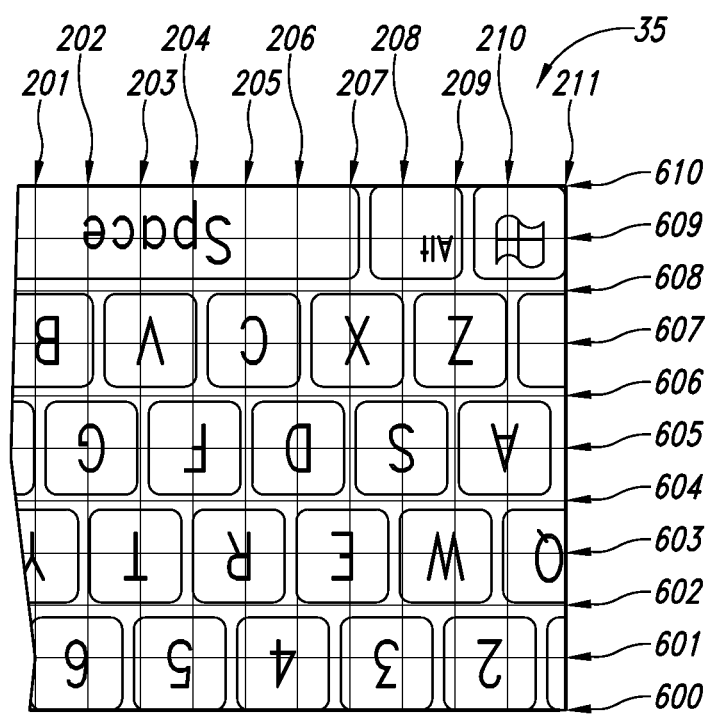
FIG. 5 is a portion of a keyboard pattern associated with the images of FIGS. 2A-2F, 3A-3D, and 4A-4C.

As mentioned above, FIGS. 2A and 3A are simplified examples of images 100, 104 taken by the sensor system 16 as a user executes key strokes on the keyboard pattern 38. The images are limited to a portion 35 of the keyboard pattern 38 for ease of explanation, which is shown in FIG. 5. In this embodiment, the portion 35 corresponds to a left hand side of a standard QWERTY keyboard as viewed by the apparatus 9.

The images 100, 104 are illustrated as 10-by-10 arrays of pixels 116 for ease of illustration. In reality, each image could have hundreds of thousands of pixels 116. For example, FIG. 4A includes a portion 322 of an image having 200 pixels corresponding to 20 columns by 10 rows. The image from which the portion 322 was cropped may have 4,000,000 total pixels corresponding to 2,000 rows and 2,000 columns.

The sensor system 16 may be a CCD or CMOS image sensor in a variety of resolutions in accordance with one embodiment of the present disclosure. Such image sensors can include hundreds of thousands to millions of pixels in each image where the pixels are arranged in a matrix of rows 135 and columns 134. In one embodiment, the sensor system 16 is implemented with a relatively low resolution image sensor. For example, the sensor system 16 may be a VGA image sensor, i.e., one having 640 columns and 480 rows of pixels. As another example, the sensor system 16 may be a CIF image sensor having 352 columns by 288 rows of pixels. However, the sensor system 16 may be implemented with any suitable image sensor of higher or lower resolutions than those discussed herein.

The sensor system 16 may be configured to capture images at a particular frequency. In one embodiment, the sensor system 16 captures images at 30 frames per second. The frequency at which images are captured may be configured to save power by only taking an image once movement has been detected in the working surface.

In one embodiment, the sensor system 16 synchronizes the image capturing with the pulses of the light source unit 12. For example, if the fan beam of light 20 is pulsed to be on for 1 millisecond, a shutter of the image sensor of the sensor system 16 is opened for 3 milliseconds. The shutter may be opened for 1 millisecond before the light is pulsed and for 1 millisecond after the pulse in order to accurately capture any tip or tips of fingers or stylus. As mentioned above, pulsing the beam of light 20 allows more power to be used per beam resulting in stronger beams of light 20. With more intense beams of light 20, reflections of, or otherwise illuminated, tips are more defined in the images.

The frequency of the pulse of the beam of light 20 may be determined by the specifications of the image sensor 16. For example, the beam of light 20 is pulsed at 30 Hertz if the image sensor 16 is configured to capture 30 frames per second. Some image sensors 16 include pins, often referred to as strobe output pins, which may be used to synchronize the pulse of the beam of light 20 with the image capture of the sensor system 16. The strobe output pin may signal the light source unit 12 to begin emitting the beam of light 20 before the sensor system 16 captures an image as well as some time after the sensor system 16 is scheduled to capture an image, so as to maximize the light available to illuminate the user's finger 24.

If the sensor system 16 is incorrectly synchronized with the light source system 12, the apparatus 9 may not accurately detect the presence of the tip 24. In order to avoid such detection errors, the pulses from the light source unit 12 may be at a frequency that is a least two times the capture frequency of the sensor system 16, which is in accordance with the Nyquist theorem.

The images 100, 104 are processed immediately in real time and are then discarded if it is determined that there is no finger in the detectable area 23. The apparatus includes a process and control system 218 to analyze the images; however, in alternative embodiments, a host or companion device may be used to process the images as described herein.

Figure 6:
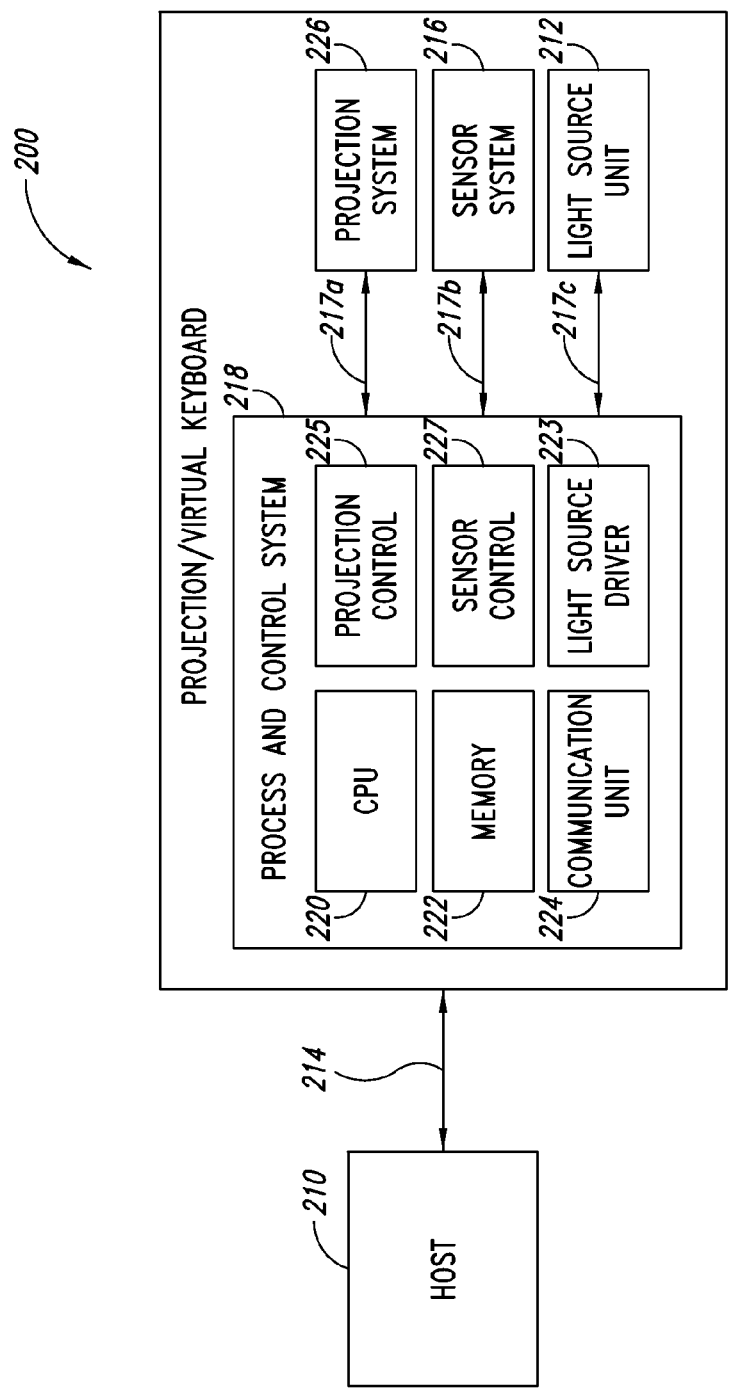
FIG. 6 is a schematic representation of the virtual keyboard system having an embedded processor in accordance with one embodiment of the present disclosure.

FIG. 6 is a schematic representation of a virtual keyboard system 200 that includes the processing and control system 218 and the host 210. The processing and control system 218 receives images from the optical sensing system 16, executes a series of routines to detect the user's fingers, detects the fingertip in the images, finds a time instance at which the finger touches the working surface or enters the detectable area 23, and determines which key is touched. When a key touch is determined, a 'Key-down' event is reported to the host 210. If the finger is still touching the key in a successive image, a 'Key-held' event is reported with every image frame as long as the finger remains touching the working surface 22. When the finger moves away from the key, a 'Key-up' event is reported.

In addition, the process and control system 218 determines when more than one finger touches the working surface 22 and generates the appropriate event for the action of each finger. Each of these events will be described in more detail below with respect to FIGS. 6-12. In particular, a routine detects the illuminated portion of the finger by computing the column-wise and row-wise histograms and determines peaks of the histogram.

For example, see FIGS. 2B and 3B where column histograms 110, 114 of the images 100, 104, respectively, are generated by the process and control system 218. FIGS. 2C and 2E are images taken of the same objects in FIG. 2A and processed to produce row histograms 610, 612 in FIGS. 2D and 2F, respectively. FIG. 3C is an image of the two objects from FIG. 3A and accompanying row histogram 616. Each of the histograms will be described in more detail below The virtual keyboard system 200 includes the projection system 26, the sensor system 16, and the light source unit 12. The process and control system 218 includes central processing unit (CPU) 220, a memory 222, a communication unit 224, a projection control unit 225, a sensor control unit 227, and a light source driver 223. Communication links 217a, 217b, 217c couple the projection system 26, the sensor system 16, and light source unit 12, respectively, to the process and control system 218.

The process and control system 218 processes the images collected from the sensor system 16 and communicates with a host device 210, such as a user's computer, a smartphone, a laptop, or other electronic device that receives text input by the user. The system 200 is coupled to the host device 210 by a communication link 214. The communication link 214 may be either a wired or wireless connection. The host may control the communication protocol over which data is sent between the host 210 and the system 200. The host 210 may provide battery recharging services through the communication link 214.

As an example, FIG. 2A is the first image 100 taken by the sensor system 16 that includes first and second fingers 106, 108 illuminated by the fan beam of light 20. The first finger 106 is positioned near a first corner 118 of the first image 106. As the first finger 106 is illuminated, a crescent or curved shape is captured. This crescent or curved shape is generally how a human finger or other curved object, such as a pen or cylindrical stylus, is imaged. If a square object is used, the image will capture a different rectangular shape.

The process and control system 218 in FIG. 6 is configured to analyze these images and determine when the finger 24 touches the working surface 22 and to detect a selection of a key or a key touch. The process and control system 218 is configured to capture the images 100, 104 and determine what event if any has occurred.

The CPU 220 performs operations stored in the memory 222, such as image sensor calibration, image correlation, digital signal processing, etc. and determines which keys are being selected by the user. The process and control system 218 may use the communication unit 224 to receive instructions from the host device 210, pass instructions to the host device 210, and transmit data representing text input from a user's finger or fingers from the detectable area 23.

The sensor control unit 227 sets the sensor system's 16 parameters such as shutter time, frame rate, beginning row and column 134, end row and column 134 of the imaging sensor, etc., and fires the sensor to take a snapshot of the working surface 22. The process and control system 218 reads the images from the sensor system 16 and stores them into the memory 222.

The projection control unit 225 controls the overall power of the projection system 26 and turns the projector system 26 on and off. The light source driver 223 drives the light source unit 12 to turn the light source unit 12 on and off and can adjust a power output. The process and control system 218 synchronizes the light source unit 12 and the sensor system 16. To make a snapshot of the working surface 22, the process and control system 218 controls the light source driver 223 to turn on the light source and controls the sensor control unit 227 to open the shutter of the sensor system to collect each image. After a period of time, sufficient to expose the image, the embedded process and control system 218 turns off the light source and closes the shutter. The image is then stored in the memory.

The process and control system 218 may synchronize the sensor system 16 and the light source unit 12 as discussed above. The embedded process and control system 218 may control the light source unit 12 to emit a continuous or a pulsed beam of light 20. The system 200 may be configured to rely on the CPU 220 and the memory 222 of the process and control system 218 while communicating with the host 210 via a wireless connection 214 so as to preserve bandwidth between the host device 10 and the system 200.

Figure 7:
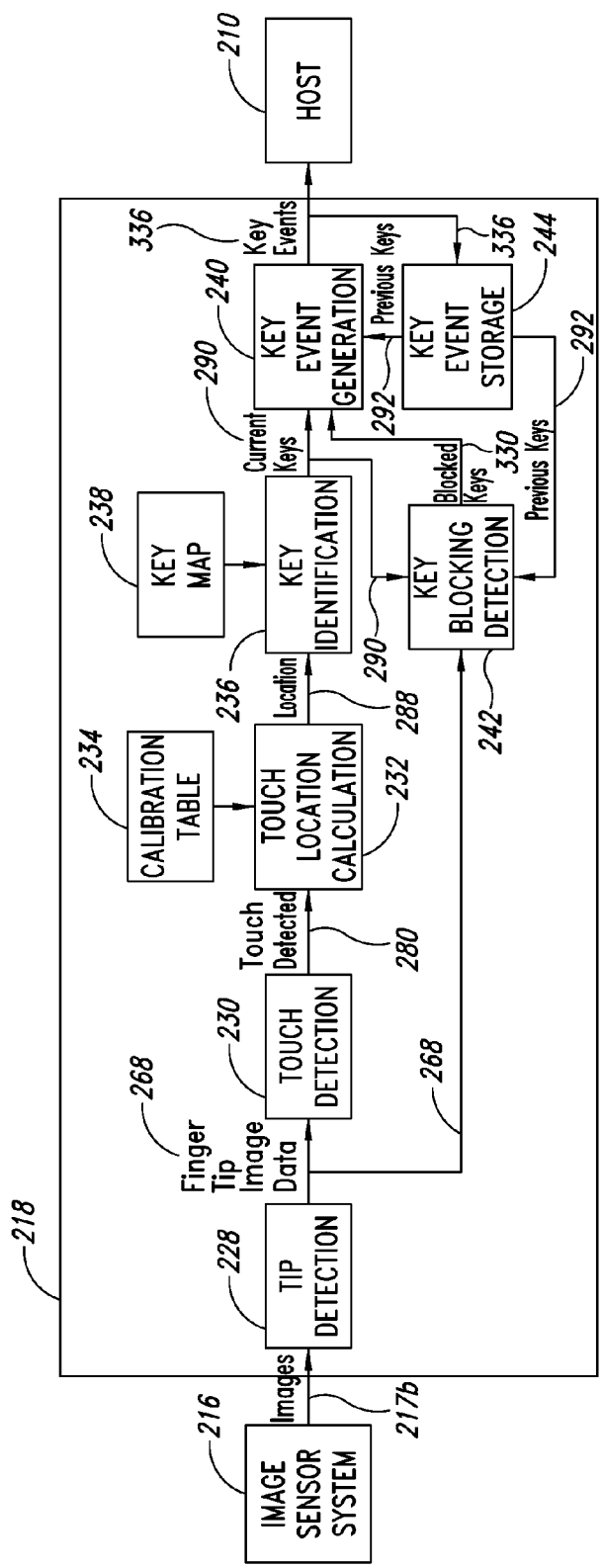
FIG. 7 is a block diagram of the virtual keyboard system according to an embodiment of the present disclosure.

FIG. 7 is a block diagram of the virtual keyboard system according to an embodiment of the present disclosure. The image sensor system 16 collects images of the working surface 22 of the projected keyboard pattern 38. These images are transmitted from the image sensor system 16 to the process and control system 218 through the communication link 217*b*.

The process and control system 218 receives the images and executes a tip detection routine 228, which processes the images and identifies locations in x and y coordinates of any fingertips in the detectable area. The tip detection routine 228 is described in more detail below with respect to FIG. 8. Subsequently, a touch detection routine 230 processes and filters detected fingertips to see if any of the fingertips touch the working surface and if any of the fingertips are still above the working surface. The touch detection routine 230 is described in more detail below with respect to FIG. 9.

A touch location calculation routine 232 receives information about fingertips that are touching the working surface 22 and accesses a calibration table 234 to determine locations (x, y) of the touching tips. The touch location routine 232 is described in more detail below with respect to FIG. 10. A key identification routine 236 searches or otherwise accesses a key map table 238 to determine what key is associated with the location (x, y). The detected key information is identified and sent to the key event generation routine 240. In addition, the detected key information is analyzed by a key blocking detection routine 242 to see if any keys are blocked by the present detected fingertips. The key blocking routine 242 and the key identification routine 236 are described in more detail below with respect to FIG. 11.

The key blocking detection routine 242 receives information about previously detected keys from a key event storage routine 244. If the key blocking detection routine determines that some of the keys are blocked, the blocked keys are reported to the key event generation routine 240. The key event generation routine generates the key events based on the detected touched key, the blocked keys, and the previously selected keys. The key events are then transmitted to the host 210. The key event generation routine 240 is described in more detail with respect to FIG. 12.

Figure 8:
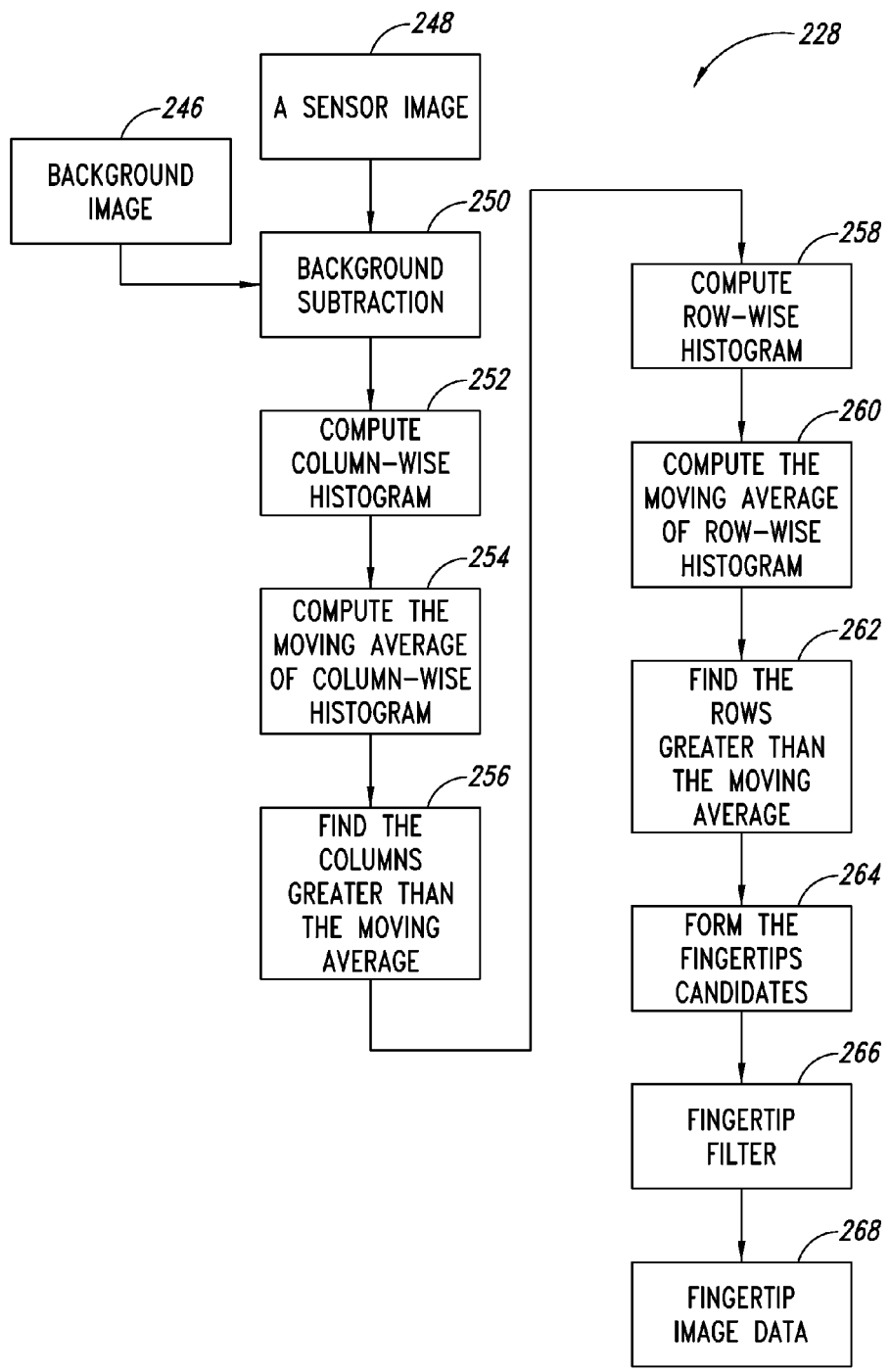
FIG. 8 is a flow chart of a method of the virtual keyboard system executing a fingertip detection routine according to an embodiment of the present disclosure.

FIG. 8 is a flowchart of a series of steps executed by the tip detection routine 228. In general, once turned on, the apparatus 9 continuously takes images of the working surface 22. As mentioned above, the first images captured by the apparatus 9 will not include a finger 24 and are considered background images. At 246, the background image is obtained, during the initialization of the virtual keyboard, and updated when there has been no user activity for a period of time. The background image may be stored in the memory 222 or otherwise stored for comparison with future images.

Alternatively, the sensor system 16 can continuously take images and compare the current image with the immediate prior image. The background image may be saved or updated once a large number of very similar successive images have been captured, such as 100 frames of images. Once a current image is identified as different from the background image, the current image is processed to remove the background image data at step 250.

At 248, the images in FIG. 2A or 3A are received by the tip detection routine 228. After the background image has been subtracted or removed, at 250, a column wise histogram is computed from the subtracted image in step 252. The histograms are sums of rows and columns of pixels. For example, as shown in FIG. 2A, the crescent shape of the first finger 106 is shown extending across three pixels 120, 122, 124. The crescent shape of the first finger 108 is shown extending across four pixels 126, 128, 130, 132. FIG. 2B is the histogram 110 that represents a sum of each column 134 of the array of pixels 116. More particularly, the values in each column 134 of pixels 116 are summed to determine the intensity of light per column 134. The histogram 110 includes two spikes 136, 138 that correspond to the first and second fingers 106, 108, respectively. In an alternative embodiment, an average of the intensity of light may be used to form the histogram 110, which would be similar to the sum with a different scale.

The intensity of the first spike 136 is greater than the second spike 138 because the crescent shape of the first finger 106 is larger than the crescent shape of the second finger 108. The first spike 136 is aligned with a center of the column that contains the pixel 122, which includes most of the image of the first finger 106. The pixel 122 has the most intensity per pixel in the array of pixels 116. The intensity of the second spike 138 is aligned with a border of two adjacent columns that contain the pixel 128 and the pixel 130, which corresponds to a center portion of the second finger 108. In addition, the first finger 106 is more intense because the first finger is closer to the image sensor 16.

For example, in one embodiment, the image sensor captures the intensity of photons incident upon each pixel 116 in a pixel array. Objects closer to the image sensor 16 will provide a stronger intensity of incidence of photons that is captured by the image sensor than objects located farther away from the sensor, such as the first finger 106 as compared to the second finger 108, respectively. The intensity of the photons is measured from the time of the most recent reset, which may be the opening of a shutter over the sensor. The photon intensity is then converted to a voltage. Each pixel in a row of the pixel array may be simultaneously read out. Upon reading every row of the pixel array, the apparatus 9 may calculate the average intensity of every column 134 of the pixel array by summing each pixel in each column 134. Because the image sensor is capturing filtered reflections of a particular frequency within the field of view 36 or detectable area 23, the histogram, i.e., a plot of intensity versus column number, indicates columns where a substantial increase in the average intensity of pixels corresponds to reflections from a finger or fingertip.

Subsequently, a moving average 111 of the column-wise histogram is determined in step 254. The moving average 111, which is represented in FIG. 2B, is calculated for a pre-defined window width n. For example, the moving average 111 of column k of a window (2m+1) is computed as the following formula:

$$\frac{1}{2m+1} \sum_{i=k-m}^{k+m} \text{COLUMN}(i)$$

where the COLUMN(i) is the column sum of column i. In a preferred embodiment, the window width is an odd number. The data being summed includes m columns to the left and right of the column k that is being evaluated. For example, the moving average 111 may be computed by summing 21 total columns together and dividing by 21. That is ten columns to the left of column k, plus column k, plus ten columns to the right of column k.

In step 256, the tip detection routine 228 determines which columns from the column wise sums or averages are greater than the moving average 111. Segments 136a, 138a that correspond to columns that are greater than the moving average 111 are good candidates for detecting a finger 24 in detectable area 23.

The columns associated with the segments 136a, 138a are separated or otherwise cut from the image 248 in order to limit the data processed to determine a row-wise histogram 610, 612, at 258. For example, FIGS. 2C and 2E are examples of groups of columns 134 separated from the image 100 for the row-wise histograms that are associated with segments 136a, 138a, respectively.

In one embodiment, the tip detection routine 228 determines a width of a first slice 184 and a second slice 194 of the image 100 based where the column histogram 110 crosses the moving average 111, i.e., based on points 186, 188 for the first spike 136 and points 190, 192 for the second spike 138. From these points, the tip detection routine 228 takes the first slice 184, which has three columns that contain the first finger 106 and the second slice 194, which has four columns that contain the second finger 108. In some embodiments, the slice determined from the points 186, 188, 190, 192 may only include most of the finger, such that edges of the finger in the image are not included in the slice, see FIG. 4A.

At 258, the rows of the first and second slice 184, 194 are each summed to form the row histograms 610 and 612. In step 260, a moving average 611, 613 for the row-wise histogram 610, 612, respectively, is generated. As with the column-wise histogram, a segment 614, 615 of the histogram that is greater than the moving average is identified in step 262. The rows associated with the segments 614, 615 are identified. For example, in FIG. 2D, the first finger 106 is only in a single row, first row 180. In FIG. 2E, the second finger 108 is also only in a single row, second row 182. In reality, a finger will likely span several rows of pixels 116, see FIG. 4A.

At 264, fingertip candidates are formed, which correspond to column coordinates and row coordinates. For example, the column coordinates (m, n) and the row coordinates (r, s) may define a block of the image in which there is a fingertip candidate. This is repeated for each slice 184, 194 for the image 100.

The points 186, 188 and points 190, 192 each create a first column coordinate for the first finger 106 and the second finger 108. For example, if the columns are numbered numerically by the leftmost edge of the column, the points 186, 188 may be associated with a first column edge 202 and a second column edge 205 to form the column coordinates (202, 205). The points 190, 192 of the second finger 108 would then have the column coordinates of (206, 210), which correspond to a third column edge 206 and a fourth column edge 210. These column coordinates are saved and will be used by calibration tables to determine what letter the finger has selected.

The row coordinates are determined with points 618, 620 of the histogram 610 and correspond to a height of the first finger 106, which will be described further below. Row coordinates can be determined from the points 618, 620, which correspond to a first row edge 601 and a second row edge 602. Thus, the row coordinates for the first finger 106 are (601, 602). Points 622, 624 correspond to the second finger 108, where the row histogram 612 crosses the moving average 613. These points also correspond to a third row edge 607 and a fourth row edge 608. This provides the row coordinates (607, 608) for the second finger 108.

The first finger has column coordinates (202, 205) and row coordinates (601, 602) and the second finger has column coordinates (206, 210) and row coordinates (607, 608). These coordinates define a tip box, i.e., the boundaries of a tip in an image, which will be used by another routine described in more detail below.

Once the fingertip candidates are acquired and the column and row coordinates are determined, the tip detection routine 228 executes a fingertip filter, at 266. The filter filters out the fingertip based on the block size of the fingertip candidates, i.e., based on the column coordinates (m, n) and the row coordinates (r, s). The tip detection routine 228 outputs fingertip image data, i.e., information about the fingertip or fingertips, including the associated row and column coordinates, at 268.

FIG. 3A is another example of detecting the row and column coordinates from the histograms. The second image 104 is of another key stroke of the first and second fingers 106, 108. The first and second fingers 106, 108 are shown close together in the third image 104. The first finger 106 is located in six pixels 160, 162, 164, 166, 168, 170. The pixels 160, 170 are in one column, the pixels 162, 168 are in a second column, and the pixels 164, 166 are in a third column. Once each of these columns is averaged or summed, the intensity of the first finger 106 is illustrated by a first spike 172 in the third histogram 114 in FIG. 3B.

The second finger 108 is located in four pixels 174, 176, 178, 166. Pixel 166 also includes a portion of the first finger 106. The third histogram 114 has a valley 180 that corresponds to the column having the pixel 166, which includes a portion of both the first and the second fingers 106, 108. The third histogram 114 also has a second spike 182 that corresponds to the thickest portion of the second finger 108, which is the largest intensity of light captured by the image sensor.

The crescent produced by imaging the first and second fingers 106, 108 will change in area depending on the user's finger size and a distance from the image sensor. The particular area is not relevant in this disclosure because each column of each image is summed to determine intensity spikes. In addition, if other objects are used, the images will not necessarily be crescent shaped. For example, if a rectangular stylus is used, the image sensor will capture a rectangular representation of the stylus.

A moving average 626 is determined to locate a portion of the histogram 114 above the moving average 626. As with the discussion above, a portion 628 of the histogram 626 can help determine a most intense pixel in the image and help determine a center point of the finger. In this image, the first and second fingers may appear as a single finger that will be evaluated and separated by the key blocking routine discussed below.

Figure 9:
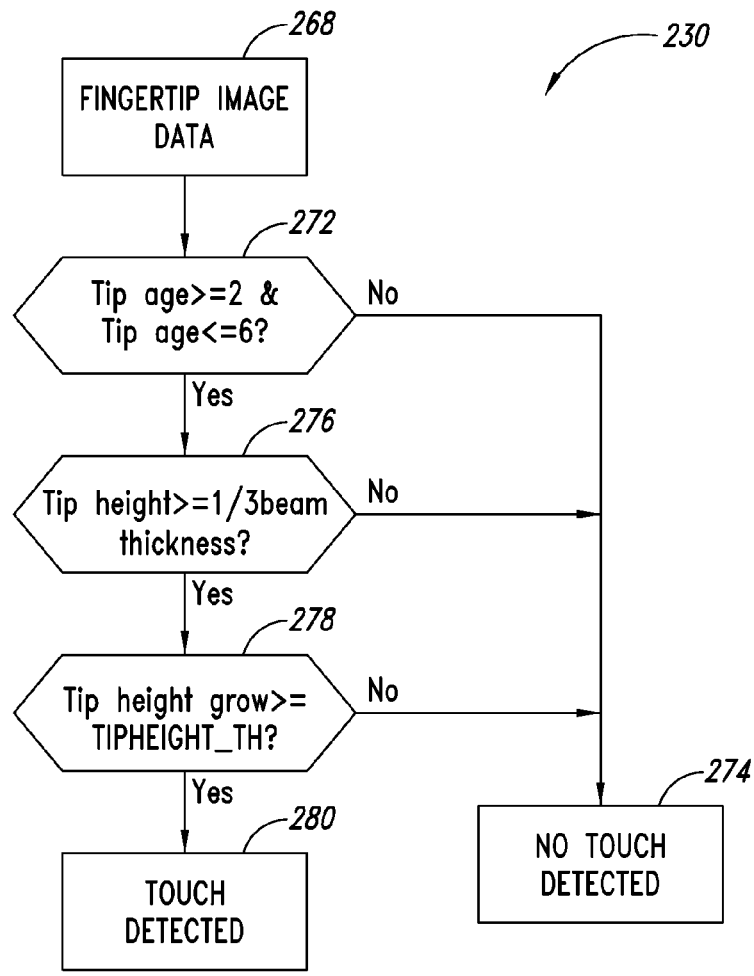
FIG. 9 is a flow chart of a method of the virtual keyboard system executing a touch detection routine according to an embodiment of the present disclosure.

FIG. 9 is a flow chart of a method of the virtual keyboard system executing a touch detection routine 230 according to an embodiment of the present disclosure. At 268, the fingertip image data from the tip detection routine 228 is received by the touch detection routine 230. A touch of the finger on the working surface 22 is determined if three conditions are met. The conditions are provided to determine if the user intends to touch the working surface or select a key. If the finger moves fast enough and penetrates the beam far enough, the routine determines the user intended to touch to select a key.

These three conditions include evaluating a count or tip age during which a tip appears in the images, a tip dimension as compared to a beam thickness, and the tip dimension as compared to a tip dimension threshold value. At 272, the tip age is determined by the number of consecutive frames in which the tip appears. A count begins as soon as a tip is detected in a frame. The count or age is zero for the first frame in which the tip is detected. For each consecutive frame after count zero, one count is added for each frame in which the tip is still detected. Accordingly, if the tip appears in the next frame the tip age becomes 1. In order to meet the first criteria, the count or tip age must be either greater than or equal to 2 consecutive images frames and less than or equal to 6 consecutive images frames.

If the tip age does not meet the first criteria, the touch detection routine 230 returns "No Touch Detected" at 274. If the tip age does meet the first criteria, the touch detection routine 230 executes the second criteria, at 276.

The second criteria determines a dimension of the tip image and compares the dimension to a thickness of the beam of light 20. The dimension of the tip is determined by the number of rows in which the tip fits. For example, the first finger 106 having the row coordinates (601, 602) has a dimension of 1 row.

The thickness of the beam of light 20 is not constant from one end of the image to the other. For example, the thickness of the beam of light 20 is smaller closer to the light source 12 and the thickness of the beam of light 20 is larger farther from the light source 12. Accordingly, the first finger 106 interacts with a different thickness of the beam of light 20 than the second finger 108. As mentioned above, the fingers appear larger the closer they are to the apparatus 9 because they reflect more light.

A beam thickness table is generated or otherwise obtained during beam calibration, such as when the apparatus 9 is being tested before shipment to a retailer or consumer. The beam thickness table can be accessed with the row coordinates to determine what thickness of the beam to compare to the dimension of the tip height. In order to meet the second criteria, the finger should penetrate at least one third of the beam. Accordingly, the dimension should be greater than or equal to one third of the thickness of the beam of light. Since the thickness of the beam may vary based on light source fluctuations and other circumstances, the dimension is compared to one third of the actual thickness. Other sizes of the beam thickness may be compared based on the qualifications and intensity of the light source of the apparatus 9.

If the dimension does not meet the second criteria at 276, the touch detection routine outputs "No Touch Detected" at 274. However, if the second criteria is met at 276, the touch detection routine determines if the third criteria is met at 278.

The third criteria compares a change in the tip dimension from one frame to the next with a tip dimension threshold value, at 278. In order to detect a touch of the finger on the working surface, the tip dimension from a first frame and a consecutive frame should change more than the tip dimension threshold value. The dimension may be referred to as a tip height or the number of rows a tip spans.

The tip dimension threshold value is not a constant number, but rather depends on a distance of the finger from the apparatus 9. The tip dimension threshold value is larger when the finger is closer to the sensor 16 and smaller when the finger is farther away from the sensor 16. A table with tip dimension threshold values, determined by the row and column coordinates, may be accessed by the tip detection routine 230 to execute step 278. Comparing the images to the size or heights of the fingers in the table provides information to detect a key touch in the working surface 22. Imperfections, such as a flicker, of the light source 12 can impact the usefulness of such a table. For example, when the light becomes dimmer the thickness of the beam becomes thinner, which impacts the data collected about the finger.

In an alternative embodiment, a key touch is determined by comparing the images and determining when there is a big increase of the finger size in the image sequence. Once a finger has broken the fan beam of light 20, the apparatus starts a comparison routine. A size of the finger in the images is determined. The process and control system 218 compares sequential images to determine if the size is increasing. After an increase in size is determined, the process and control system 218 waits for another 2-3 frames and determines if the finger size has increased, decreased, or stayed the same. If the finger size had decreased, the finger did not touch the working surface 22. If the finger size stays the same, the process and control system 218 waits another 2-3 frames and determines if a change has occurred. If the finger size increases for a threshold number of frames then a key touch is detected.

If a change in the dimension does not meet the third criteria at 278, the touch detection routine outputs "No Touch Detected" at 274. However, if the third criteria is met at 278, the touch detection routine returns a touch detected at 280.

In an alternative embodiment, instead of tip height the third criteria may be associated with a time period in which the finger appears in a series of images. This time period is used to determine a speed of the finger moving toward the working surface 22. A touch is detected when the speed is zero, such that all movement of the finger has temporarily stopped.

In one embodiment, the image sensor 16 operates at 30 to 60 frames per second and the thin beam of the light is in the range of 3.5 mm in beam thickness. Accordingly, there may be only 1-3 frames of images of the finger 24 as it breaks the beam of light 20 and touches the working surface 22. However, so few images can hinder accurate calculation of the speed of the finger 24.

Figure 10:
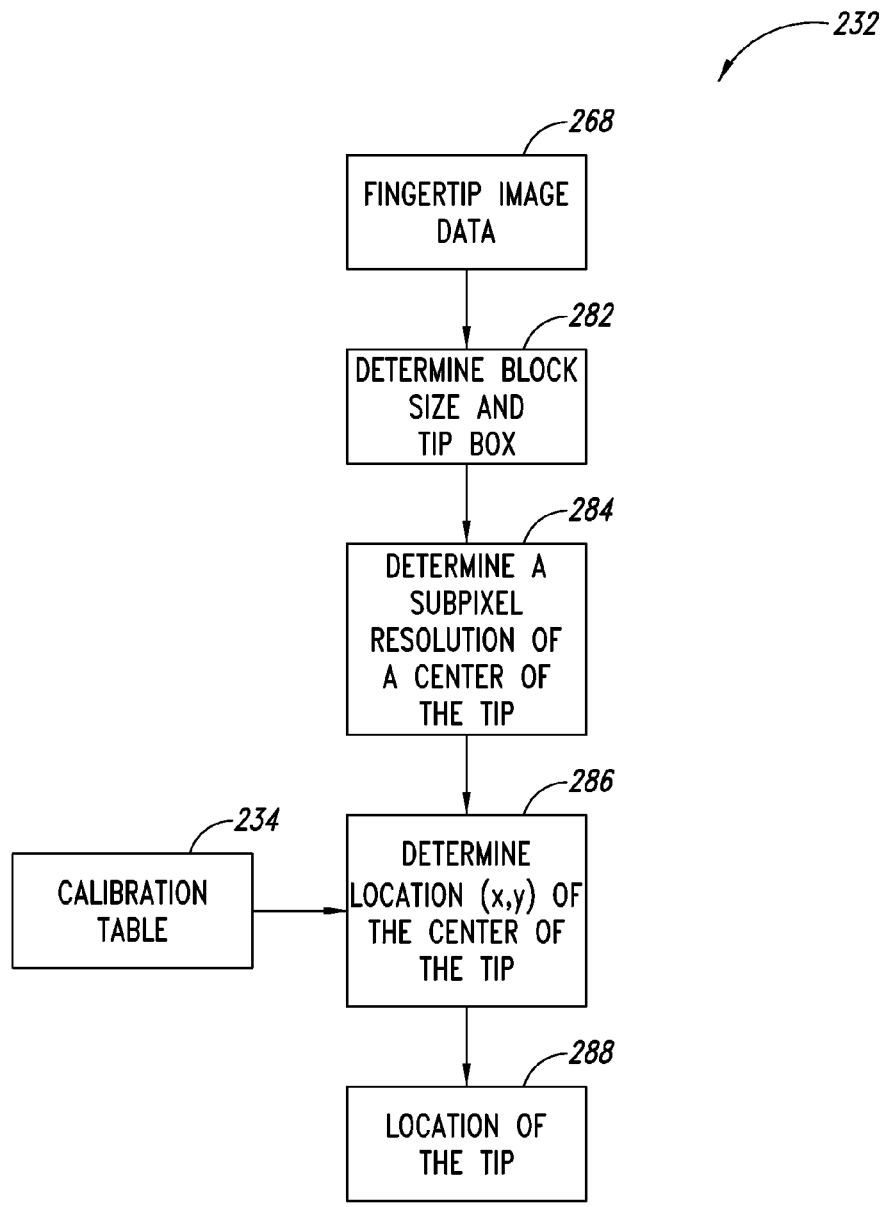
FIG. 10 is a flow chart of a method of the virtual keyboard system executing a touch location calculation routine according to another embodiment of the present disclosure.

FIG. 10 is a flow chart of a method of the virtual keyboard system executing the touch location calculation routine 232. If the touch detection routine returns a touch detected at 280, the touch location calculation routine 232 is executed. The touch location calculation routine 232 receives fingertip image data from step 268, such as the row and column coordinates (r,s) and (m,n). The row and column coordinates define a block of the image in which a fingertip is likely to be found. In one embodiment, the block is rectangular, such as in FIG. 4A; however, other shaped blocks may be used.

At 282, the touch location calculation routine 232 processes the row and column coordinates to determine the block associated with the finger. In an alternative embodiment, the block is further processed to more precisely define the finger tip, such as a tip box defined by a left, right, upper, and lower boundary of the tip, which may be smaller in size than the block defined by the row and column coordinates. The tip boundaries are determined by finding the pixel having a maximum intensity as compared to other pixels within the block. This can be achieved by comparing the pixels individually or by determining a center of the block and comparing a number of pixels around the center to find the pixel with the most intensity. For example, in FIG. 2C, the pixel with the maximum intensity would be the column between column edges 203 and 204 and the row between row edges 601 and 602. The pixel's coordinates could be represented by (row edge, column edge), such that the coordinates would be (601, 203).

With the pixel having the maximum intensity, the tip box within the block can be determined. The touch location calculation routine 232 determines a threshold intensity value with which to compare pixels around the maximum pixel. The threshold intensity value is a percentage of the intensity of the pixel having the maximum intensity. For example, 50% of the intensity of the maximum intensity may be the threshold intensity value. Subsequently, the touch location calculation routine 232 determines the right and left boundaries of the tip box, i.e., the touch location calculation routine 232 determines the row boundaries of the tip box. The touch location calculation routine 232 compares a single pixel to the right of the pixel having the maximum intensity to see if the pixel to the right is greater than the threshold intensity value, if yes, the touch location calculation routine 232 compares the pixel two to the right of the pixel having the maximum intensity. The touch location calculation routine 232 continues to compare each pixel to the right of the pixel having the maximum intensity until the pixel being compared is less than the threshold intensity value. If the pixel is less than the threshold intensity value, the coordinates of the pixel one before the pixel that is less than the threshold intensity value is used as the right boundary of the tip box.

This same process is continued for the pixels in the same row to the left of the pixel having the maximum intensity to determine the left boundary of the tip box. In addition, the touch location calculation routine 232 determines the upper and lower boundaries of the tip box through a similar process that compares pixels in the same column as the pixel having the maximum intensity.

Figure 4C:
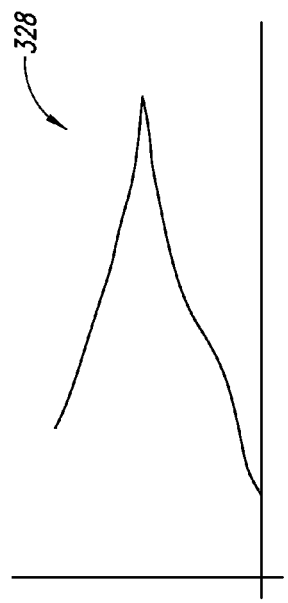
Figure 4A:
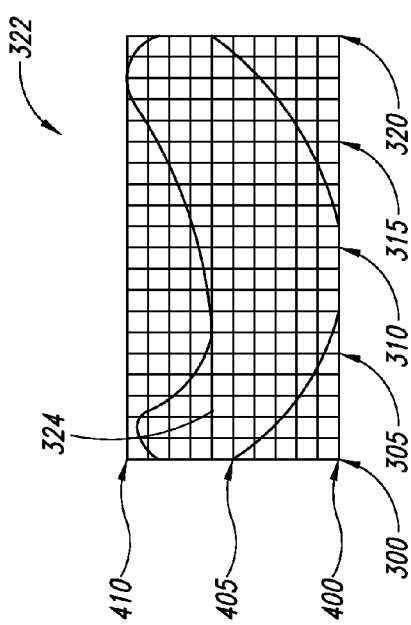
Figure 4B:
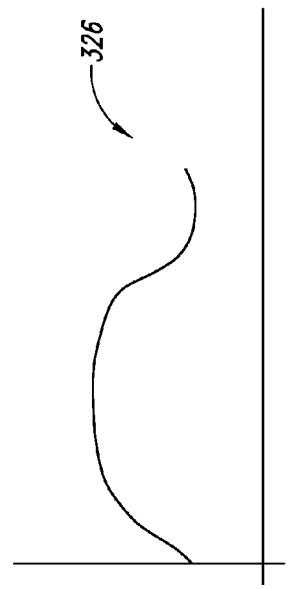

Once the boundaries of the tip box are defined, the touch location calculation routine 232 determines a subpixel resolution of a center of the tip, at 284. FIG. 4A is a portion of an image that includes a tip box 322 of a finger 324 as imaged and processed by the apparatus 9. This tip box includes 200 pixels, extending from column edge 300 to column edge 320 and row edge 400 to row edge 410. The pixel with the maximum intensity of finger 324 may have the pixel at (405, 310) such that the tip box is formed by comparing pixels to the left, right, above, and below the pixel at (405, 310) with the threshold value.

At 284, a subpixel resolution is used to determine a center of the tip 324. The touch location calculation routine 232 determines a column-wise histogram 326 and a row-wise histogram 328 for the tip box 322. Each of the pixels are added together in each row and column to form the histograms. Coordinates (row, column) of a center of the finger 324 are determined from the row and column histograms 328, 326. For example, based on the histograms the center of the finger 324 is at (405.5, 309). The coordinates do not have to be an integer value, in fact, having non integer values leads to more precise centers of the fingers.

The subpixel center detection is beneficial because fingers closer to the sensor 16 appear larger and have better resolution than fingers farther away from the sensor. Determining the center point with subpixel resolution is more accurate and provides more precise interpretation of the user's selection of a key.

At 286, the touch location calculation routine 232 determines a physical location in (x, y) coordinates associated with the keyboard from the center of the tip by accessing calibration table 234 and by using bilinear interpolation of the tip center (row, column). More particularly, the centers (row, column) of the detected objects are translated to the real world coordinate by using the calibration tables, such as calibration tables in FIGS. 14 and 15.

More particularly, bilinear interpolation is used to provide (x, y) coordinates for a physical location of the tip based on the sub-pixel value of the center of the finger tip. The physical location will be used to determine which key has been selected by the user. The sub-pixel value of the center is determined in an earlier process step. From the sub-pixel value an associated pixel is determined.

Figure 17:
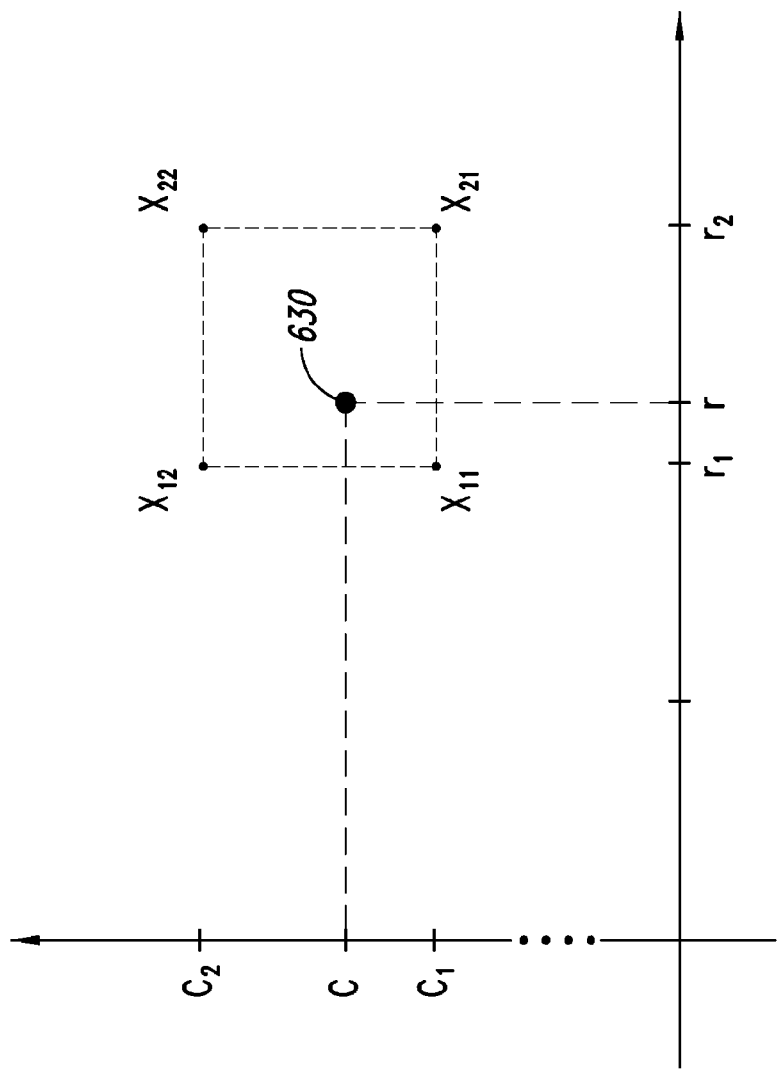
FIG. 17 is a graphical representation of a sub-pixel value associated with a center of a fingertip.

FIG. 17 is a graphical representation of the associated pixel based on a sub-pixel center 630 having non-integer row and column values, (r, c). FIG. 17 is associated with the x value of the coordinates of the physical location. The y value of the coordinates of the physical location is determined in a similar way.

The x and y values are gathered from the x-calibration table and the y-calibration table, respectively, see FIGS. 14 and 15. The x and y values are determined from the (r, c) coordinates and the closest integer row and column values, for example r1, r2, c1, and c2 from FIG. 17.

In order to perform the bilinear interpolation, the system assumes that r1<r<r2, and c1<c<c2, where r1, r2, c1 and c2 are all integers. In addition, and r2=r1+1 and c2=c1+1. For ease of discussion, in the embodiment of FIG. 17, the sub-pixel value of the center of the finger is (2.2, 633.2), where r equals 2.2 and c equals 633.2. Accordingly, r1 equals 2 and r2 equals 3. In addition, c1 equals 633 and c2 equals 634. Once the system has r, r1, r2, c, c1, and c2, the system can determine a group of x and y values from the x-calibration table and the y-calibration table to determine the (x, y) coordinates.

As shown in FIG. 17, four x values can be determined from the sub-pixel value of the center of the finger tip, $X_{11}$, $X_{12}$, $X_{21}$, and $X_{22}$. The row and column of interested for $X_{11}$ is (2, 633), then the value for x from the x-calibration table from FIG. 14 is 302. More particularly, the x value for $X_{11}$ is (r1, c1), for $X_{12}$ the value is (r1, c2), for $X_{21}$ the value is (r2, c1), and for $X_{22}$ of the value is (r2,c1).

With these values, the value X(rc) of the pixel (r,c) can be computed by: $X(r,c)=X_{11}*(r2-r)*(c2-c)+X_{21}*(r-r1)*(c2-c)+X_{12}*(r2-r)*(c-c1)+X_{22}*(r-r1)*(c-c1)$.

Similarly, the value Y(rc) of the pixel (r,c) can be computed by: $Y(r,c)=Y_{11}*(r2-r)*(c2-c)+Y_{21}*(r-r1)*(c2-c)+Y_{12}*(r2-r)*(c-c1)+Y_{22}*(r-r1)*(c-c1)$.

With the X(r,c) and the Y(r,c) values, the system can access the key map and determine which keys were selected by the user.

Figure 16:
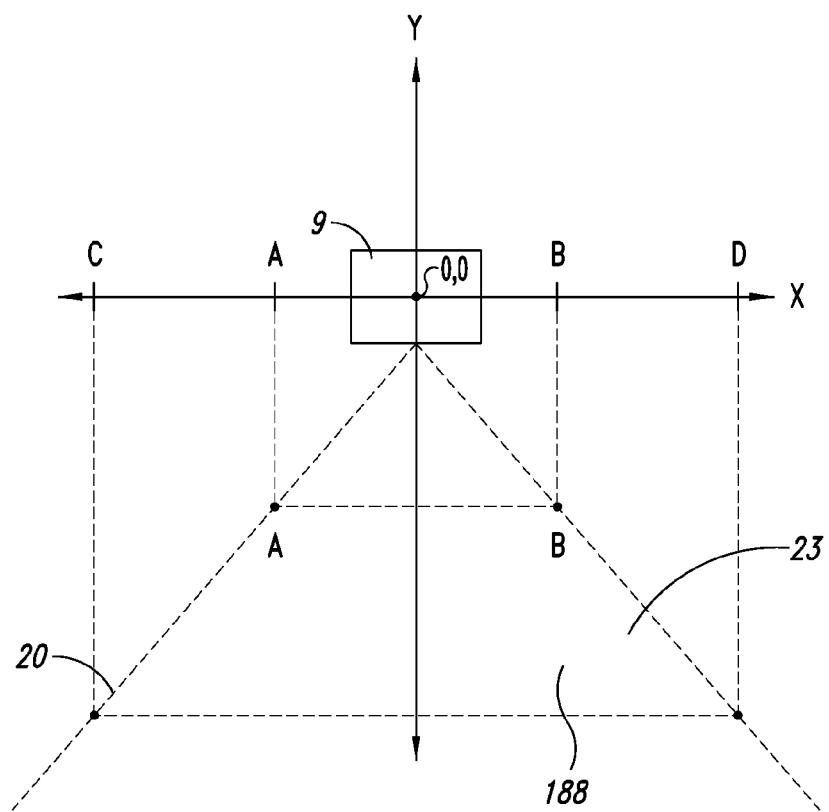
FIG. 16 is a top down view of a coordinate system superimposed over an apparatus and a working surface in accordance with the present disclosure.

Returning to the calibration tables, they are composed of a mapping from the image coordinate (row, column) to the real world coordinate (x, y). FIGS. 14 and 15 are an exemplary X-axis calibration table 500 and a Y-axis calibration table 600 that are used to translate the location of the object from the images to the location of the object with respect to the keyboard. FIG. 16 is a top down view of the apparatus 9 illustrating an X-axis and a Y-axis as referenced in the calibration tables 500, 600. The point 0, 0 on the X and Y axis of FIG. 16 passes through a center of the apparatus 9. The beam of light 20 is centered on the Y-axis and extends in both the positive and negative direction on the X-axis. Although, the beam of light 20 extends in what is normally referenced as the negative Y-axis, all of the values discussed with respect to the Y-axis will be considered positive, since only one half of the Y-axis is relevant to this discussion.

FIG. 14 is the X-axis calibration table 500 having a plurality of rows 504 and columns 502. The columns 502 represent columns 1-8 and 633-640. The rows 500 include rows 1-8, 236-243, and 473-480. The X-axis calibration table 500 includes 640 columns and 480 rows, which is consistent with a VGA sensor. In row 1, column 1, the value is negative 313 (−313), which may correspond to 31.3 mm. This value may correspond to point A on the X-axis of FIG. 16. The values illustrated in the X-axis calibration table 500 begin at a distance spaced from the apparatus 9 because the sensor system cannot accurately capture tips that are too close to the apparatus 9. In row 1, column 640, the value is positive 380, which may correspond to 30.8 mm. This value is represented by point B on the X-axis of FIG. 16.

In row 480, column 1, the value is negative 4414 (−4414), which may correspond to 441.4 mm. This value is represented by point C on the X-axis of FIG. 16. In row 480, column 640, the value is positive 4346, which may correspond to 434.6 mm. This value may be represented by point D on the X-axis of FIG. 16. A region 188 defined by the points A, B, C, and D translated onto the boundary of the beam of light 20 corresponds to the detectable area 23, which is available to be imaged by the sensor system.

In FIG. 15, the Y-axis calibration table 600 includes rows 1-8, 236-243, and 473-480. The values in each row increase gradually from 376 to 5995. Each column of the Y-axis calibration table 600 includes the same numbers for every row. The number of columns corresponds to the number of columns in the X-axis calibration table 500. Repeating the row values for each column of the Y-axis calibration table 600 may aid the software in determining location information for each image.

For example, with the coordinates (row, column) of a center of the finger 324, determined from the row and column histograms 328, 326, the (x, y) coordinates representative of a location associated with the virtual keyboard can be located using the calibration tables. If the row center coordinate is 242 and the column center coordinate is 636, the x coordinate value would be 1312 and the y coordinate value would be 1796. Another example, if the row center coordinate value is 2.5 and the column center v coordinate value is 6.5, then four values from the x-axis table and four values from the y-axis table will be evaluated, i.e., for the x-axis table, col. 2, row 6 (−317), col. 3, row 6 (−316), col. 2, row 7 (−318), and col. 3, row 7 (−317) would be evaluated. An average of all of the values is −317, which will be the x coordinate. Similarly, for the y-axis table, col. 2, row 6 (382), col. 3, row 6 (382), col. 2, row 7 (384), and col. 3, row 7 (384) would be evaluated. An average of all of these values is 383, which would return coordinates of (−317, 383) that correspond to the user's finger in the detectable area 23. This location coordinate from the tables would be output from the location detection routine 232, at 288. The location coordinates are used by the key identification routine 236 to determine a selected key from the key map 238.

It should be noted that in this embodiment, 480 pixels are available to represent a distance from front to back on the working surface. If a front-to-back distance that is proportional to the side to side distance is to be implemented, then the distances represented between rows may be greater than the distances represented between columns. A second reason why the differences between rows may differ from the distances between columns has to do with the shape of the working area on the working surface. The beam of light 20 extending from the light source unit 12 extends at an angle from the housing. Accordingly, the pixels capturing data that is farther away from the sensor 16 may represent greater changes in location than the pixels capturing data from a portion of the working area that is nearer to the sensor 16.

The calibration table 500 can be created during the testing of the apparatus. For example, the calibration table may be created by placing a unique image in front of the apparatus, capturing the image, then performing data processing on that image.

Alternatively, the calibration table 500 may be created manually by placing an object in the working area, capturing an image, changing the location of the object in the working area, recapturing an image, and processing the data to determine how the object in the working area correlates with pixels in the image sensor.

The calibration table may be stored in memory and utilize by a processor located on the virtual memory device. Alternatively, the calibration table may be installed on a host device during installation of drivers on the host device which are operable to enable the host device to communicate with the apparatus.

Returning to FIG. 7, the location coordinates of the tip are fed into the key identification routine 236, which accesses a key map 238 to determine a currently selected key based on the location coordinates. For example, looking at the image 100 of FIG. 2A, the (x, y) coordinates of the tip correspond to a key on the keyboard in FIG. 5. For example, the location coordinate for the first finger 106 corresponds to a '5' on the portion 35 of the keyboard pattern 38 and the second finger 108 corresponds to an 'x.' In addition, the image 104 of FIG. 3A includes the first finger 106 selecting the letter 'e' and the second finger 108 corresponds to the letter 's.' The location coordinates are determined by using the center point of the tip to retrieve data from the calibration tables.

Figure 11:
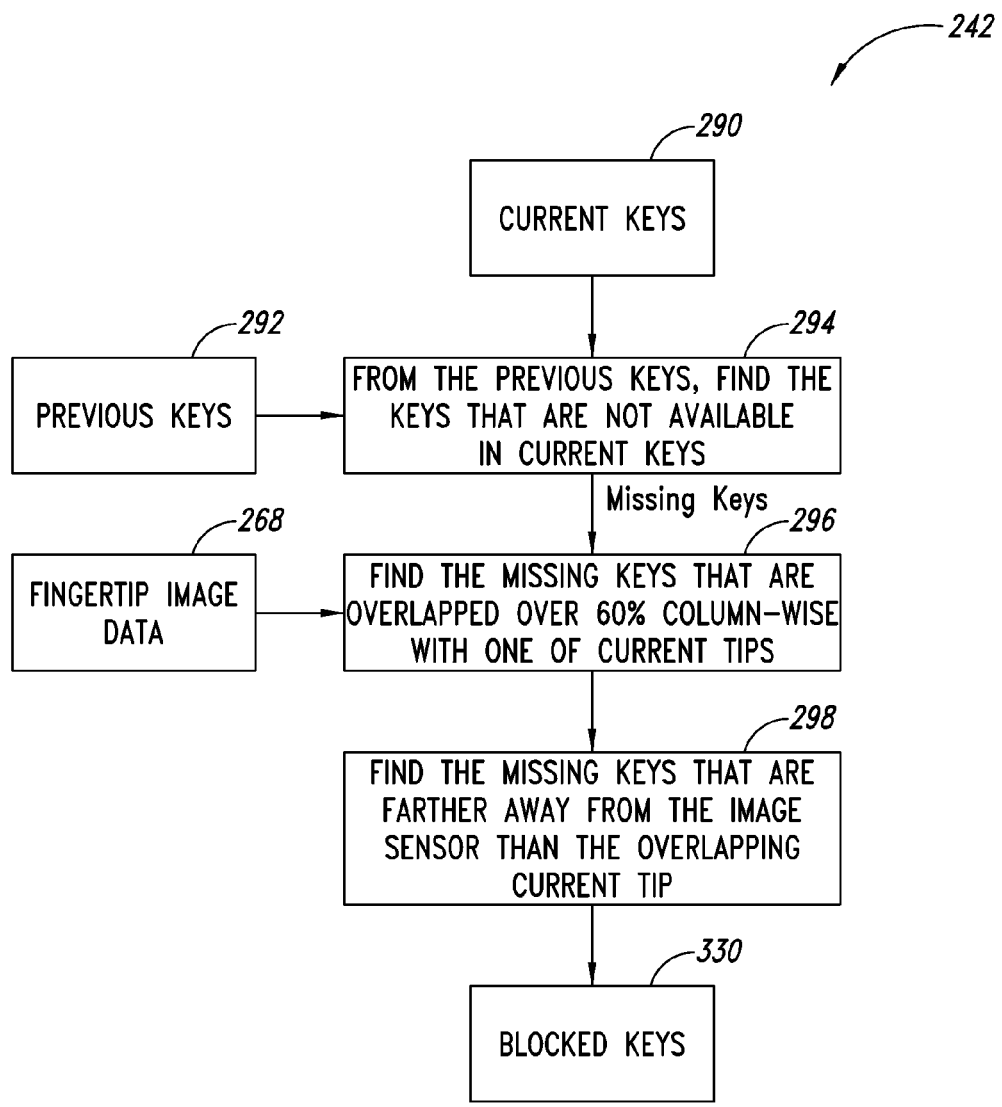
FIG. 11 is a flow chart of a method of the virtual keyboard system executing a key blocking detection routine according to an embodiment of the present disclosure.

FIG. 11 is a flow chart of a method of the virtual keyboard system executing a key blocking detection routine 242. The key blocking detection routine 242 is for detecting any keys being blocked by any other keys from the perspective of the image sensor 16. Some key strokes will image fingers very close together or overlapping, such as to capitalize some letters. For example, to capitalize the letter 'a' the keys 'SHIFT+A' must be selected. The 'SHIFT' key is pressed first, then, the 'A' key is pressed. Before the key 'A' is pressed, the finger pressing the 'SHIFT' key is visible in the image. Once the key 'A' is pressed, the finger that is still pressing the 'SHIFT' key may be blocked by the finger that is pressing the 'A' key. As a result, the blocked finger may not be imaged or may only be partially imaged.

At 294, the key detection routine 242 receives the current key information from the key identification routine 236 and determines if any previously imaged keys are no longer appearing in the current image. The current key information is the selected key or keys as returned from the location coordinates and the key map. The key detection routine compares a previous keys list with the current keys list. If some keys of the previous keys are no longer present in the current image, they keys may be blocked or they may no longer be selected by the user.

At 296, the routine 242 receives the fingertip image data output at 268 from the tip detection routine 228, see FIG. 8. The key blocking detection routine 242 then determines if any of the missing keys overlap with the current finger tips located in the current image based on a column wise comparison. For example, if one of the missing keys overlaps the columns of the current fingertip image data by 60 percent, the missing key may be a blocked key. The overlapping percentage can be adjusted as needed based on the configuration of the image sensor and the properties of the apparatus 9.

In FIG. 3A, only a portion of the second finger 108 is visible to the image sensor 16. If the second finger 108 was put down first, such that in an image prior to image 104, the only finger imaged was finger 108, the second finger 108 may have the current key row coordinates (604, 606) and the current key column coordinates (207, 209), which correspond to an 's' in FIG. 5.

In the image of FIG. 3A, the system may detect a single large finger with current key row coordinates of (603, 606) and the current key column coordinates of (205, 209). At 295, the key blocking detection routine 242 would determine that the missing key, 's' was overlapped at least 60% with the current key 'e'.

At 298, the key blocking detection routine 242 determines if the missing key is separated from the image sensor 16 by the current key. If so, the routine 242 outputs that the missing key is a blocked key, at 330. The determination of distance from the image sensor may be achieved by comparing the row coordinate numbers. For example, if lower row numbers are closer to the image sensor, the key is blocked if its row numbers are larger than the current key's row numbers.

Figure 12:
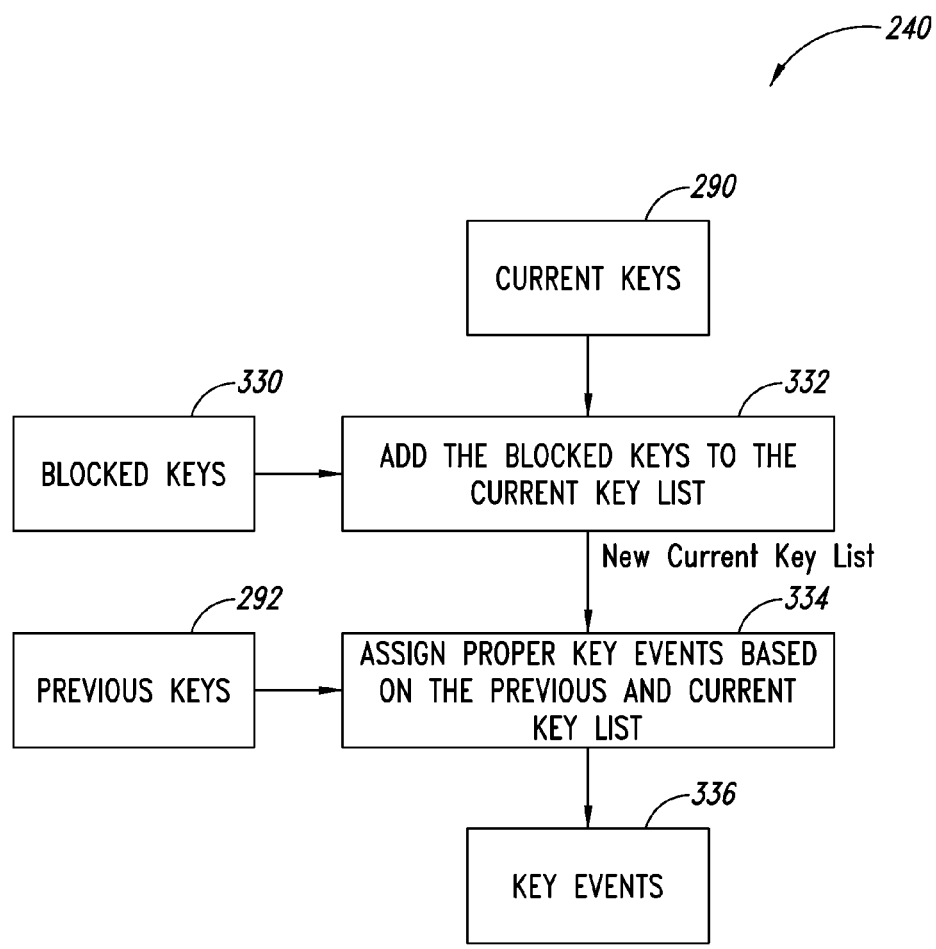
FIG. 12 is a flow chart of a method of the virtual keyboard system executing a key event generation routine according to an embodiment of the present disclosure.

The current key information output from the key identification routine 236 and the blocked key data output from the key blocking detection routine 242 are received by the key event generation routine 240. FIG. 12 is a flow chart of a method of the virtual keyboard system executing the key event generation routine 240. At 332, the key event generation routine 240 adds the blocked keys to the current key list. At 334, the key event generation routine 240 compares the current key list with the previous key's list and determines if an event should be output. Below are a list of possible key events.

KEY-DOWN EVENT: If a key is in the current key list, but not in the previous key list, a key down event is outputted associated with the key at 336.

KEY-UP EVENT: If a key is only in the previous key list, but not in the current key list, a key up event is outputted associated with the key at 336.

KEY-HELD EVENT: If a key is in both the current and previous key list, a key held event is outputted associated with the held key at 336.

The key events are received by the host to display the appropriate text on the screen or display.

Figure 13:
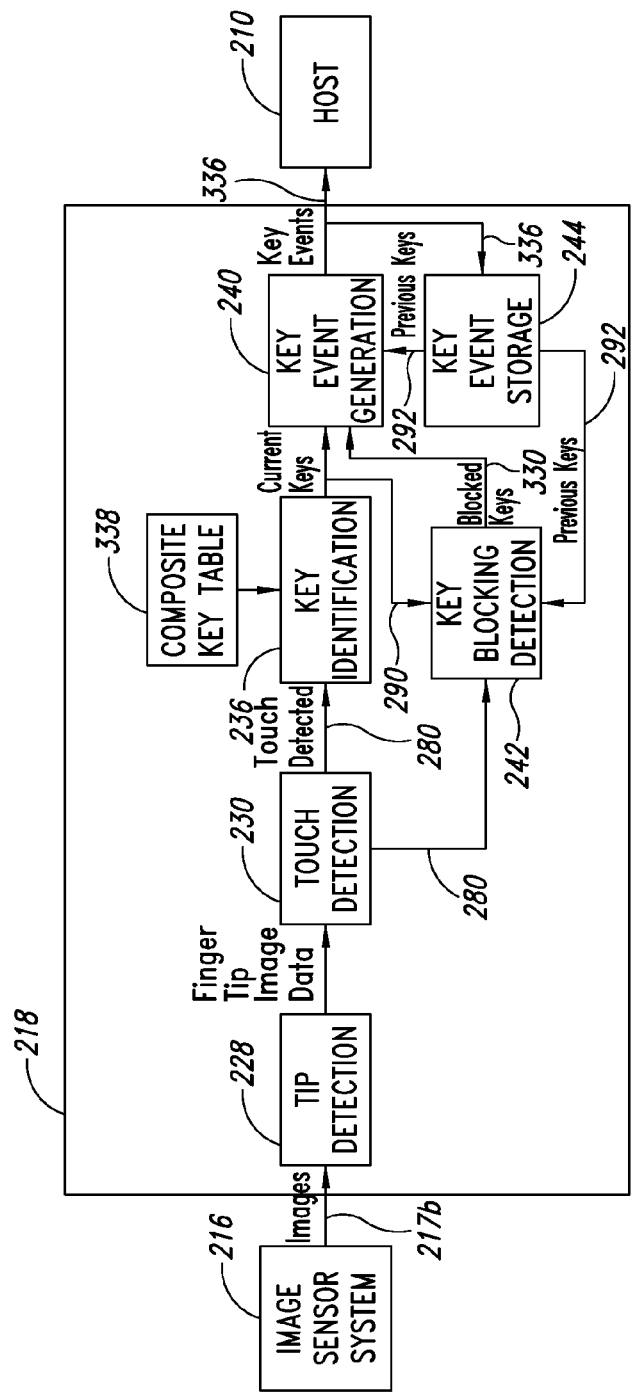
FIG. 13 is a block diagram of an alternative embodiment of the virtual keyboard system.

FIG. 13 is a flow chart of a method of an alternative embodiment of the virtual keyboard system that utilizes a composite key table 338, a calibration table, and a key map table. The composite key table is created by combining the calibration table (the x, y tables) and the key map table. This eliminates the step of determining a location of the tip and instead uses the row and column coordinates to map to a specific key. Accordingly, computation performance can be significantly improved.

For example, as discussed above with respect to FIG. 2A, the row and column coordinates associated with the tip block can be used to access the composite key table to determine the keys selected by the fingers. In FIG. 2A, the first finger 106 selects a '5' and the second finger 108 selects an 'x.' The first finger 106 having the row coordinates (601, 602) and the column coordinates (202, 205) and the second finger 108 having the row coordinates (607, 608) and the column coordinates (206, 210).

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A method, comprising:
providing a plane of light above a working area, the working area including indicia of a virtual keyboard having a plurality of keys;
capturing images of the working area with an image capture device positioned above the plane of light, the images including rows of pixels and columns of pixels;
detecting a selected key of the plurality of keys, the detecting of the selected key including:
 detecting an object adjacent to the selected key by analyzing each of the captured images for variations in light intensity, the detecting of the object including:
  generating a first histogram by summing the light intensity in each of a first number of columns;
  determining a second number of columns corresponding to a portion of the first histogram that is above a first threshold light intensity value;
  generating a second histogram by summing the light intensity in each of a first number of rows in the second number of columns;
  determining a second number of rows corresponding to a portion of the second histogram that is above a second threshold light intensity value;
 determining an identification of the selected key from the light intensity corresponding to the pixels in the second number of rows and the second number of columns; and
outputting the identification of the selected key to a host device.

2. The method of claim 1, further comprising:
detecting if the object touches a working surface in the working area, the detecting including:
 subtracting a background image from each captured image;
 determining a first moving average for the first histogram and a second moving average for the second histogram;
 determining the second number of columns by determining the portion of the first histogram that is greater than the first moving average; and
 determining the second number of rows by determining the portion of the second histogram that is greater than the second moving average.

3. The method of claim 2 wherein the plane of light is configured to produce the light intensity when the object interacts with the plane of light.

4. The method of claim 3 wherein detecting if the object touches the working surface further includes:
determining a dimension of the object in each captured image based on the second number of rows; and
comparing the dimension of the object to a thickness of the plane of light.

5. The method of claim 2 wherein detecting if the object touches the working surface further includes:

counting a number of consecutive captured images that include the object; and determining if the number of consecutive captured images is above a lower touch threshold and below an upper touch threshold.

6. The method of claim 2 wherein detecting if the object touches the working surface further includes:

determining if a dimension of the object is increasing by comparing successive captured images.

7. The method of claim 1 wherein determining the identification of the selected key based on the first histogram and the second histogram includes:

determining a center of the object by analyzing the second number rows and the second number of columns;

accessing a calibration table to determine coordinates of the center of the object; and determining the identification of the selected key from the coordinates by accessing a key map.

8. The method of claim 7 wherein determining the center of the object includes:

generating a third histogram based on the second number of TOWS;

generating a fourth histogram based on the second number columns;

determining a first peak of the third histogram; and determining a second peak of the fourth histogram.

9. A system, comprising:

a working area that includes indicia of a virtual keyboard having a plurality of keys;

a device that includes:

a light source configured to produce a plane of light above the working area;

an image sensor module positioned above the plane of light and configured to capture images of the working area, each captured image including rows of pixels and columns of pixels;

a key selection module configured to analyze the captured images for variations in light intensity, the variations of light intensity associated with an object in the working area, the key selection module further configured to:

generate a first histogram based on the light intensity in each of a first number rows in each of the captured images;

determine a second number of rows from the first histogram that correspond to the light intensity being above a first threshold light intensity value;

generate a second histogram based on the light intensity in each of a first number columns in the second number of rows;

determine a second number of columns from the second histogram that correspond to the light intensity being above a second threshold light intensity value;

determine an identification of a selected key of the plurality of keys based on the light intensity in the second number of rows and the second number of columns; and output the identification of the selected key to a host device.

10. The system of claim 9 wherein the key selection module includes:

an object detection module configured to detect the object in the captured images;

a touch detection module configured to detect if the object touches a working surface of the working area;

a location module configured to determine a coordinate from the captured images that corresponds to a location on the working surface touched by the object;

a key identification module configured to determine the identification of the selected key based on the coordinate from the captured images; and a key event generation module configured to output a key event identifier to the host device associated with a text input by a user.

11. The system of claim 10 wherein the key event generation module further includes:

a key event storage module configured to store a current key list associated with the selected key and a previous key list associated with a previously selected key; and a key blocking detection module configured to compare the current key list and the previous key list to determine if the selected key includes an additional key blocked from the image sensor module.

12. The system of claim 10 wherein the object detection module is further configured to:

subtract a background image from each captured image;

determine a first moving average for the first histogram and a second moving average for the second histogram;

determine segments of the first histogram that are greater than the first moving average;

determine the second number of rows associated with the segments of the first histogram that are greater than the first moving average;

determine segments of the second histogram that are greater than the second moving average; and determine the second number of columns associated with the segments of the second histogram that are greater than the second moving average.

13. The system of claim 10 wherein the plane of light is configured to produce the light intensity in the captured images when the object interacts with the plane of light.

14. The system of claim 13 wherein the touch detection module is further configured to:

determine a dimension of the object in each captured image based on the second number of rows; and compare the dimension of the object to a thickness of the plane of light.

15. The system of claim 10 wherein the touch detection module is further configured to count a number of consecutive captured images that include the object and determine if the number of consecutive captured images is above a lower touch threshold and below an upper touch threshold.

16. The system of claim 10 wherein the touch detection module is configured to compare successive captured images and determine if a dimension of the object is increasing.

17. The system of claim 9 wherein the key selection module is configured to analyze the second number of rows and the second number of columns, access a calibration table to determine coordinates of a center of the object, access a key map, and determine the identification of the selected key from the coordinates.

18. The system of claim 17 wherein the key selection module is configured to generate a third histogram based on the subset of rows, generate a fourth histogram based on the subset of columns, determine a first peak of the third histogram, and determine a second peak of the fourth histogram.

19. A system, comprising:

a light source configured to produce a plane of light above a working area, the working area including indicia of a virtual keyboard having a plurality of keys;

an image sensor module positioned above the plane of light and configured to capture images of the working area, each captured image including rows of pixels and columns of pixels;

a processor configured to analyze the captured images for variations in light intensity, the variations of light intensity associated with an object in the working area, the processor further configured to:

generate a first histogram based on the light intensity in each of a first number rows in each of the captured images;

generate a first moving average from the first histogram;

determine a second number of rows from the first histogram that have a light intensity above the first moving average;

generate a second histogram based on the light intensity in each of a first number of columns in the second number of rows;

generate a second moving average from the second histogram;

determine a second number of columns from the second histogram that have a light intensity above the second moving average; and determine an identification of a selected key of the plurality of keys based on the light intensity in the second number of rows and the second number of columns.

20. The system of claim 19 wherein the processor is further configured to detect a dimension of the object in each captured image based on the second number of rows and compare the dimension of the object to a thickness of the plane of light.

21. The system of claim 19 further comprising a housing, the light source and the image sensor being positioned in the housing.

22. The system of claim 19 wherein the image sensor is positioned at an angle to capture the light intensity reflected off the object when the object crosses the plane of light.

* * * * *

UNITED STATES PATENT AND TRADEMARK OFFICE
CERTIFICATE OF CORRECTION

| | | |
|---|---|---|
| PATENT NO. | : 8,497,841 B1 | Page 1 of 1 |
| APPLICATION NO. | : 13/593344 | |
| DATED | : July 30, 2013 | |
| INVENTOR(S) | : Cheng-Feng Sze et al. | |

It is certified that error appears in the above-identified patent and that said Letters Patent is hereby corrected as shown below:

In the Claims

Column 21, Lines 22-23,
"generating a third histogram based on the second number of TOWS;" should read, --generating a third histogram based on the second number of rows;--.

Signed and Sealed this
Twenty-third Day of December, 2014

Michelle K. Lee
*Deputy Director of the United States Patent and Trademark Office*